(12) United States Patent
Seo et al.

(10) Patent No.: US 10,581,561 B2
(45) Date of Patent: *Mar. 3, 2020

(54) METHOD AND APPARATUS FOR TRANSMITTING ACK/NACK IN WIRELESS COMMUNICATION SYSTEM

(71) Applicant: LG ELECTRONICS INC., Seoul (KR)

(72) Inventors: Dongyoun Seo, Seoul (KR); Joonkui Ahn, Seoul (KR); Suckchel Yang, Seoul (KR); Yunjung Yi, Seoul (KR); Daesung Hwang, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/587,071

(22) Filed: May 4, 2017

(65) Prior Publication Data
US 2017/0237541 A1    Aug. 17, 2017

Related U.S. Application Data

(63) Continuation of application No. 14/650,064, filed as application No. PCT/KR2013/011828 on Dec. 18, 2013, now Pat. No. 10,389,488.
(Continued)

(51) Int. Cl.
*H04L 1/18* (2006.01)
*H04W 74/00* (2009.01)
(Continued)

(52) U.S. Cl.
CPC ....... *H04L 1/1822* (2013.01); *H04B 7/15557* (2013.01); *H04L 1/1854* (2013.01);
(Continued)

(58) Field of Classification Search
CPC ............... H04L 5/0055; H04L 5/0032; H04W 72/0413; H04W 72/042
See application file for complete search history.

(56) References Cited

U.S. PATENT DOCUMENTS 8,036,491 B2 * 10/2011 Matsui ................. G06T 7/35
345/672
8,811,332 B2  8/2014 Yin et al.
(Continued)

FOREIGN PATENT DOCUMENTS

CN  101288247 A  10/2008
CN  102025467 A  4/2011
(Continued)

OTHER PUBLICATIONS

U.S. Appl. No. 14/650,064, filed Jun. 5, 2015.
(Continued)

*Primary Examiner* — Ayaz R Sheikh
*Assistant Examiner* — Debebe A Asefa
(74) *Attorney, Agent, or Firm* — Dentons US LLP

(57) ABSTRACT

Provided are a method for transmitting an ACK/NACK by a terminal configured with a plurality of serving cells, and a terminal using such a method. The method comprises: receiving data from a downlink subframe of a first serving cell; and transmitting the data for the ACK/NACK signal from an uplink subframe of a second serving cell; wherein the uplink subframe is determined in accordance with the ACK/NACK timing of the first serving cell, or the ACK/NACK timing of the second serving cell if the data is received from a downlink subframe of the second serving cell, which is identical to the downlink subframe of the first serving cell.

10 Claims, 18 Drawing Sheets

Related U.S. Application Data

(60) Provisional application No. 61/882,004, filed on Sep. 25, 2013, provisional application No. 61/896,015, filed on Oct. 25, 2013, provisional application No. 61/738,394, filed on Dec. 18, 2012.

(51) Int. Cl.

| | | |
|---|---|---|
| *H04W 16/32* | (2009.01) | |
| *H04W 48/12* | (2009.01) | |
| *H04B 7/155* | (2006.01) | |
| *H04L 5/00* | (2006.01) | |
| *H04W 76/19* | (2018.01) | |
| *H04L 5/14* | (2006.01) | |
| *H04W 72/04* | (2009.01) | |
| *H04W 84/02* | (2009.01) | |

(52) U.S. Cl.
CPC .............. *H04L 5/0055* (2013.01); *H04L 5/14* (2013.01); *H04W 16/32* (2013.01); *H04W 48/12* (2013.01); *H04W 72/0413* (2013.01); *H04W 74/002* (2013.01); *H04W 74/004* (2013.01); *H04W 74/006* (2013.01); *H04W 76/19* (2018.02); *H04L 1/1812* (2013.01); *H04W 84/025* (2013.01)

(56) References Cited

U.S. PATENT DOCUMENTS

| | | | | |
|---|---|---|---|---|
| 8,817,673 | B2* | 8/2014 | Li | H04L 1/1861 370/252 |
| 8,923,273 | B2* | 12/2014 | Seo | H04L 1/1614 370/248 |
| 9,036,491 | B2 | 5/2015 | Yin | |
| 9,055,568 | B2 | 6/2015 | Yang et al. | |
| 9,083,520 | B2* | 7/2015 | Lee | H04L 1/1671 |
| 2010/0304689 | A1 | 12/2010 | McBeath et al. | |
| 2011/0130820 | A1 | 6/2011 | Cragg et al. | |
| 2011/0310820 | A1 | 12/2011 | Liao | |
| 2012/0113876 | A1 | 5/2012 | Li et al. | |
| 2012/0213170 | A1 | 8/2012 | Choi et al. | |
| 2012/0257552 | A1 | 10/2012 | Chen et al. | |
| 2012/0269140 | A1 | 10/2012 | Nam et al. | |
| 2012/0269180 | A1 | 10/2012 | Li et al. | |
| 2013/0039231 | A1* | 2/2013 | Wang | H04W 72/10 370/280 |
| 2013/0070652 | A1 | 3/2013 | Li et al. | |
| 2013/0201841 | A1 | 8/2013 | Zhang et al. | |
| 2013/0308550 | A1 | 11/2013 | Yin et al. | |
| 2013/0322358 | A1 | 12/2013 | He et al. | |
| 2014/0241329 | A1 | 8/2014 | Lin et al. | |
| 2014/0301231 | A1 | 10/2014 | Hooli et al. | |
| 2014/0334359 | A1 | 11/2014 | Yin et al. | |
| 2015/0304074 | A1 | 10/2015 | Seo et al. | |

FOREIGN PATENT DOCUMENTS

| | | |
|---|---|---|
| CN | 102625456 A | 8/2012 |
| CN | 102651680 A | 8/2012 |
| EP | 2688237 A2 | 1/2014 |
| EP | 3051868 A1 | 8/2016 |
| JP | 2012-110022 A | 6/2012 |
| KR | 1020110003584 A | 1/2011 |
| KR | 1020120095278 A | 8/2012 |
| KR | 10-2012-0120080 A | 11/2012 |
| WO | 2012/081867 A2 | 6/2012 |
| WO | 2012109195 A2 | 8/2012 |
| WO | 2012161510 A2 | 11/2012 |

OTHER PUBLICATIONS

Li, et al.: "Control Channel Design for Carrier Aggregation between LTE FDD and LTE TDD Systems", XP032202278, 2012 IEEE 75th Vehicular Technology Conference, Yokohama, Japan, May 6-9, 2012, pp. 1-5.

* cited by examiner

METHOD AND APPARATUS FOR TRANSMITTING ACK/NACK IN WIRELESS COMMUNICATION SYSTEM

This application is a continuation of U.S. patent application Ser. No 14/650,064, filed Jun. 5, 2015, now allowed, which is a National Stage Entry of International Application No. PCT/KR2013/011828, filed Dec. 18, 2013, and claims the priority to and benefit of U.S. Provisional Application Nos. 61/738,394 filed Dec. 18,2012, 61/882,004 filed Sep. 25, 2013, and 61/896,015 filed Oct. 25, 2013, all of which are hereby incorporated by reference in their entirety for all purpose as if fully set forth herein.

BACKGROUND OF THE INVENTION

Field of the Invention

The present invention relates to wireless communications, and more particularly, to a method and apparatus for transmitting a reception acknowledgement for a hybrid automatic repeat request (HARQ) in a wireless communication system in which serving cells using a radio frame of different types with each other are aggregated.

Related Art

Long Term Evolution (LTE) based on $3^{rd}$ Generation Partnership Project (3GPP) Technical Specification (TS) Release 8 is the leading next-generation mobile communication standard.

As disclosed in 3GPP TS 36.211 V8.7.0 (2009-05) "Evolved Universal Terrestrial Radio Access (E-UTRA); Physical Channels and Modulation (Release 8)", in LTE, a physical channel can be divided into a Physical Downlink Shared Channel (PDSCH) and a Physical Downlink Control Channel (PDCCH), that is, downlink channels, and a Physical Uplink Shared Channel (PUSCH) and a Physical Uplink Control Channel (PUSCH), that is, uplink channels.

A PUCCH is an uplink control channel used to send uplink control information, such as a Hybrid Automatic Repeat reQuest (HARQ), an acknowledgement/not-acknowledgement (ACK/NACK) signal, a Channel Quality Indicator (CQI), and a Scheduling Request (SR).

Meanwhile, 3GPP LTE-Advanced (A) that is the evolution of 3GPP LTE is in progress. Technology introduced into 3GPP LTE-A includes a carrier aggregation.

A carrier aggregation uses a plurality of component carriers. A component carrier is defined by the center frequency and a bandwidth. One downlink component carrier or a pair of an uplink component carrier and a downlink component carrier correspond to one cell. It can be said that a terminal being served using a plurality of downlink component carriers is being served from a plurality of serving cells.

A time division duplex (TDD) system uses the same frequency in downlink and uplink cases. Therefore, one or more downlink subframes are associated with an uplink subframe. The 'association' implies that transmission/reception in the downlink subframe is associated with transmission/reception in the uplink subframe. For example, when a transmission block is received in a plurality of downlink subframes, a user equipment transmits HARQ ACK/NACK (hereinafter, ACK/NACK) for the transmission block in the uplink subframe associated with the plurality of downlink subframes. At the moment, a minimum time is required to transmit the ACK/NACK. This is because a time for processing the transmission block and a time for generating ACK/NACK are required.

A frequency division duplex (FDD) system uses different frequencies in downlink and uplink cases. The uplink subframe and the downlink subframe have the relationship of 1:1. In this case, the ACK/NACK for the transmission block which is received in the downlink subframe is transmitted in the uplink subframe after four subframes.

Meanwhile, in a next generation wireless communication system, a serving cell that uses the TDD and a serving cell that uses the FDD may be aggregated. That is, a plurality of serving cells that use a radio frame of different types with each other may be allocated to a user equipment. In this case, it is problematic in which way the ACK/NACK is transmitted.

SUMMARY OF THE INVENTION

The present invention provides a method and apparatus for transmitting ACK/NACK in a wireless communication system in which serving cells using a radio frame of different types with each other are aggregated.

In one aspect, a method for transmitting an acknowledgement/not-acknowledgement (ACK/NACK) of a user equipment in which a plurality of serving cells is configured is provided. The method includes receiving data in a downlink subframe of a second serving cell and transmitting an ACK/NACK signal in response to the data in an uplink subframe of a first serving cell. The uplink subframe is determined based on an ACK/NACK timing of the first serving cell.

In another aspect, a method for transmitting an acknowledgement/not-acknowledgement (ACK/NACK) of a user equipment in which a plurality of serving cells is configured is provided. The method includes receiving data in a downlink subframe of a second serving cell and transmitting an ACK/NACK signal in response to the data in an uplink subframe of a first serving cell. The uplink subframe is determined based on an ACK/NACK timing of the second serving cell.

In still another aspect, a user equipment is provided. The user equipment includes a radio frequency (RF) unit configured to transmit and receive a radio signal and a processor connected to the RF unit. The processor is configured to perform receiving data in a downlink subframe of a second serving cell and transmitting an ACK/NACK signal in response to the data in a uplink subframe of a first serving cell. The uplink subframe is determined based on an ACK/NACK timing of the first serving cell.

In a wireless communication system in which serving cells using a radio frame of different types with each other are aggregated, a user equipment can effectively transmit ACK/NACK. Accordingly, the system performance is increased.

DESCRIPTION OF EXEMPLARY EMBODIMENTS

User Equipment (UE) can be fixed or can have mobility. UE can also be called another term, such as a Mobile Station (MS), a Mobile Terminal (MT), a User Terminal (UT), a Subscriber Station (SS), a wireless device, a Personal Digital Assistant (PDA), a wireless modem, or a handheld device.

The BS commonly refers to a fixed station that communicates with UE. The BS can also be called another tem, such as an evolved-NodeB (eNodeB), a Base Transceiver System (BTS), or an access point.

Communication from a BS to UE is called downlink (DL), and communication from UE to a BS is called uplink (UL). A wireless communication system including a BS and UE can be a Time Division Duplex (TDD) system or a Frequency Division Duplex (FDD) system. A TDD system is a wireless communication system that performs UL and DL transmission/reception using different times in the same frequency band. An FDD system is a wireless communication system that enables UL and DL transmission/reception at the same time using different frequency bands. A wireless communication system can perform communication using radio frames.

Figure 1:
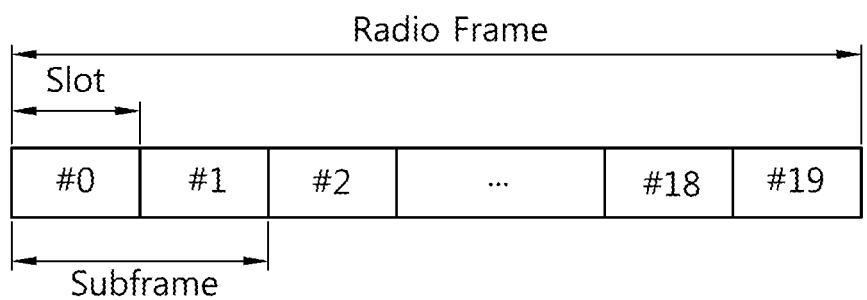
FIG. 1 shows the structure of an FDD radio frame.

FIG. 1 shows the structure of an FDD radio frame.

The FDD radio frame includes 10 subframes, and one subframe includes two consecutive slots. The slots within the radio frame are assigned indices 0~19. The time that is taken for one subframe to be transmitted is called a Transmission Time Interval (TTI). A TTI can be a minimum scheduling unit. For example, the length of one subframe can be 1 ms, and the length of one slot can be 0.5 ms. Hereinafter, the FDD radio frame may be simply referred to as an FDD frame.

Figure 2:
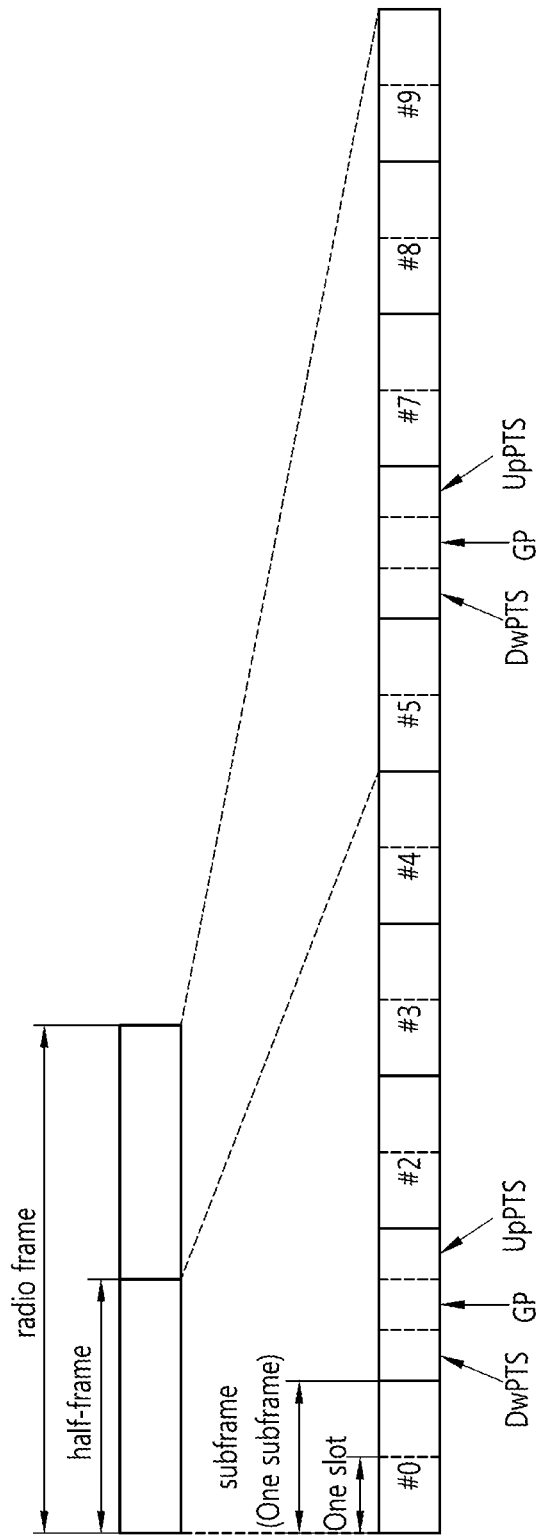
FIG. 2 shows the structure of a TDD radio frame.

FIG. 2 shows the structure of a TDD radio frame.

Referring to FIG. 2, a downlink (DL) subframe and an uplink (UL) subframe coexist in a TDD radio frame used in TDD. Table 1 shows an example of a UL-DL configuration of the radio frame.

TABLE 1

| Uplink-downlink configuration | Downlink-to-uplink switch-point periodicity | Subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, 'D' indicates a DL subframe, 'U' indicates a UL subframe, and 'S' indicates a special subframe. When a UL-DL configuration is received from a BS, a UE can be aware of whether each subframe in a radio frame is a DL subframe or a UL subframe. Hereinafter, reference can be made to Table 1 for a UL-DL configuration N (N is any one of 0 to 6).

In the TDD frame, a subframe having an index #1 and an index #6 may be a special subframe, and includes a downlink pilot time slot (DwPTS), a guard period (GP), and an uplink pilot time slot (UpPTS). The DwPTS is used in initial cell search, synchronization, or channel estimation in UE. The UpPTS is used for channel estimation in a BS and for the uplink transmission synchronization of UE. The GP is an interval in which interference occurring in UL due to the multi-path delay of a DL signal between UL and DL is removed. Hereinafter, the TDD radio frame may be simply referred to as a TDD frame.

Figure 3:
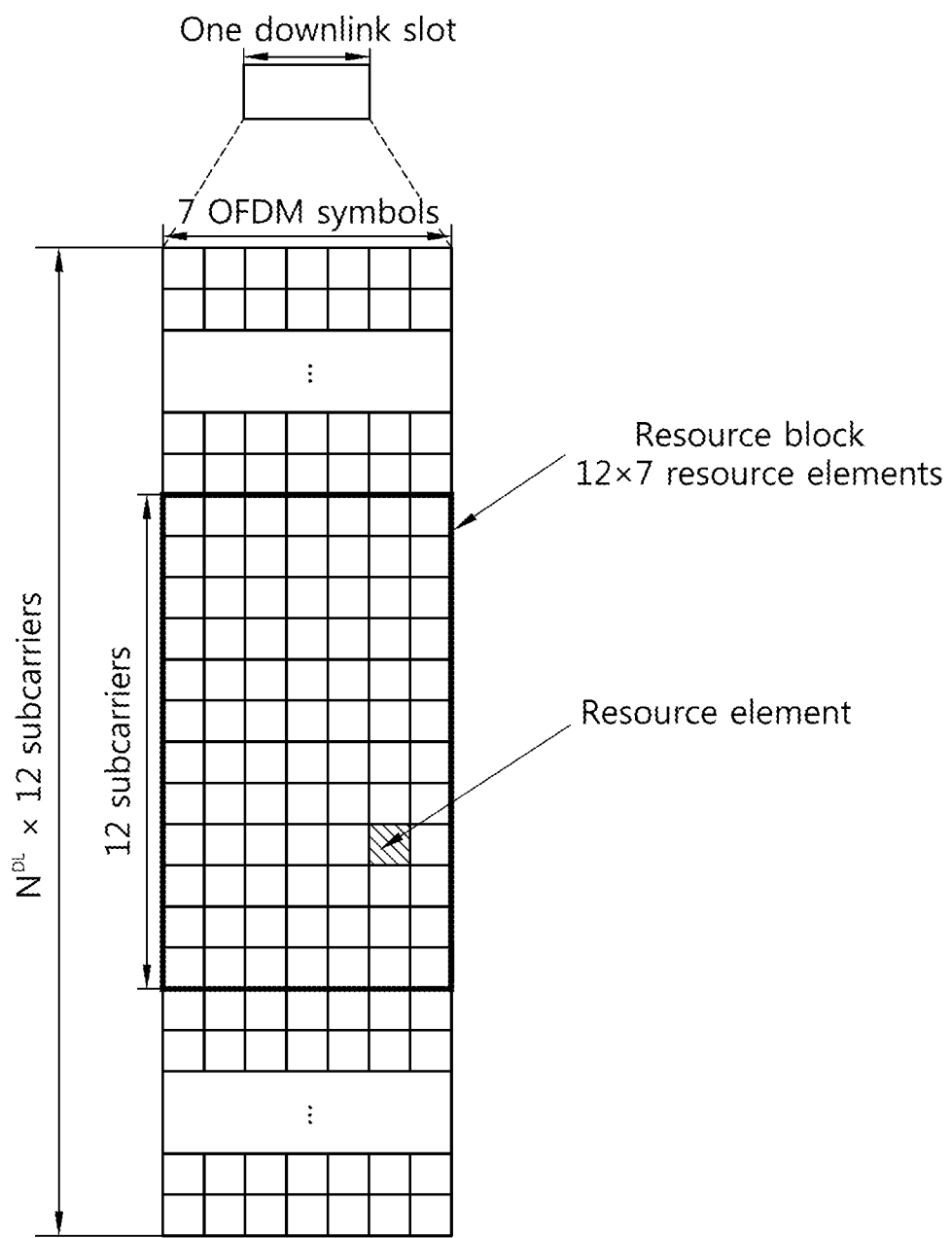
FIG. 3 shows an example of a resource grid for one downlink slot.

FIG. 3 shows an example of a resource grid for one downlink slot.

Referring to FIG. 3, the downlink slot includes a plurality of Orthogonal Frequency Division Multiplexing (OFDM) symbol in the time domain and includes $N_{RB}$ Resource Blocks (RBs) in the frequency domain. The RBs includes one slot in the time domain and a plurality of consecutive subcarrier in the frequency domain in a resource allocation unit. The number of RBs $N_{RB}$ included in the downlink slot depends on a downlink transmission bandwidth $N^{DL}$ configured in a cell. For example, in an LTE system, the $N_{RB}$ can be any one of 6 to 110. An uplink slot can have the same structure as the downlink slot.

Each element on the resource grid is called a Resource Element (RE). The RE on the resource grid can be identified by an index pair (k,l) within a slot. Here, k (k=0, . . . , $N_{RB} \times 12-1$) is a subcarrier index within the frequency domain, and l (l=0, . . . , 6) is an OFDM symbol index within the time domain.

Although 7×12 REs including 7 OFDM symbols in the time domain and 12 subcarrier in the frequency domain have been illustrated as being included in one RB in FIG. 3, the number of OFDM symbols and the number of subcarriers within an RB are not limited thereto. The number of OFDM symbols and the number of subcarriers can be changed in various ways depending on the length of a CP, frequency spacing, etc. In one OFDM symbol, one of 128, 256, 512, 1024, 1536, and 2048 can be selected and used as the number of subcarriers.

Figure 4:
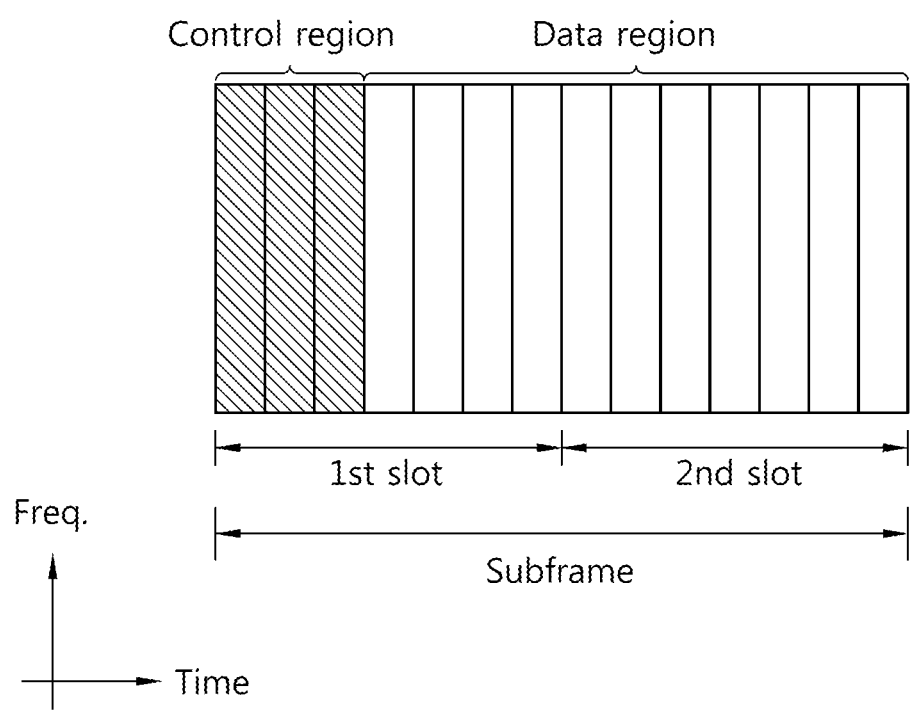
FIG. 4 shows the structure of a DL subframe.

FIG. 4 shows the structure of a DL subframe.

Referring to FIG. 4, a downlink (DL) subframe is divided into a control region and a data region in the time domain. The control region includes a maximum of former 3 (maximum 4 according to circumstances) OFDM symbols of a first slot within a subframe, but the number of OFDM symbols included in the control region can be changed. A control channel different from a physical downlink control channel (PDCCH) is allocated to the control region, and a physical downlink shared channel (PDSCH) is allocated to the data region.

As disclosed in 3GPP TS 36.211 V8.7.0, in 3GPP LTE, physical channels can be divided into a physical downlink shared channel (PDSCH) and a physical uplink shared channel (PUSCH), that is, data channels, and a physical downlink control channel (PDCCH), a physical control format indicator channel (PCFICH), a physical hybrid-ARQ indicator channel (PHICH), and a physical uplink control channel (PUCCH), that is, control channels.

A PCFICH that is transmitted in the first OFDM symbol of a subframe carries a Control Format Indicator (CFI) regarding the number of OFDM symbols (i.e., the size of a control region) that are used to send control channels within the subframe. UE first receives a CFI on a PCFICH and then monitors PDCCHs. Unlike in a PDCCH, a PCFICH is not subject to blind decoding, but is transmitted through the fixed PCFICH resources of a subframe.

A PHICH carries a positive-acknowledgement (ACK)/negative-acknowledgement (NACK) signal for an uplink Hybrid Automatic Repeat reQuest (HARQ). An ACK/NACK signal for uplink (UL) data on a PUSCH which is transmitted by UE is transmitted on a PHICH.

A physical broadcast channel (PBCH) is transmitted in the former 4 OFDM symbols of a second slot within the first subframe of a radio frame. The PBCH carries system information that is essential for UE to communicate with a BS, and system information transmitted through a PBCH is called a Master Information Block (MIB). In contrast, system information transmitted on a PDSCH indicated by a PDCCH is called a System Information Block (SIB).

Control information transmitted through a PDCCH is called Downlink Control Information (DCI). DCI can include the resource allocation of a PDSCH (this is also called a DL grant), the resource allocation of a PUSCH (this is also called an UL grant), a set of transmit power control commands for individual MSs within a specific UE group and/or the activation of a Voice over Internet Protocol (VoIP).

Figure 5:
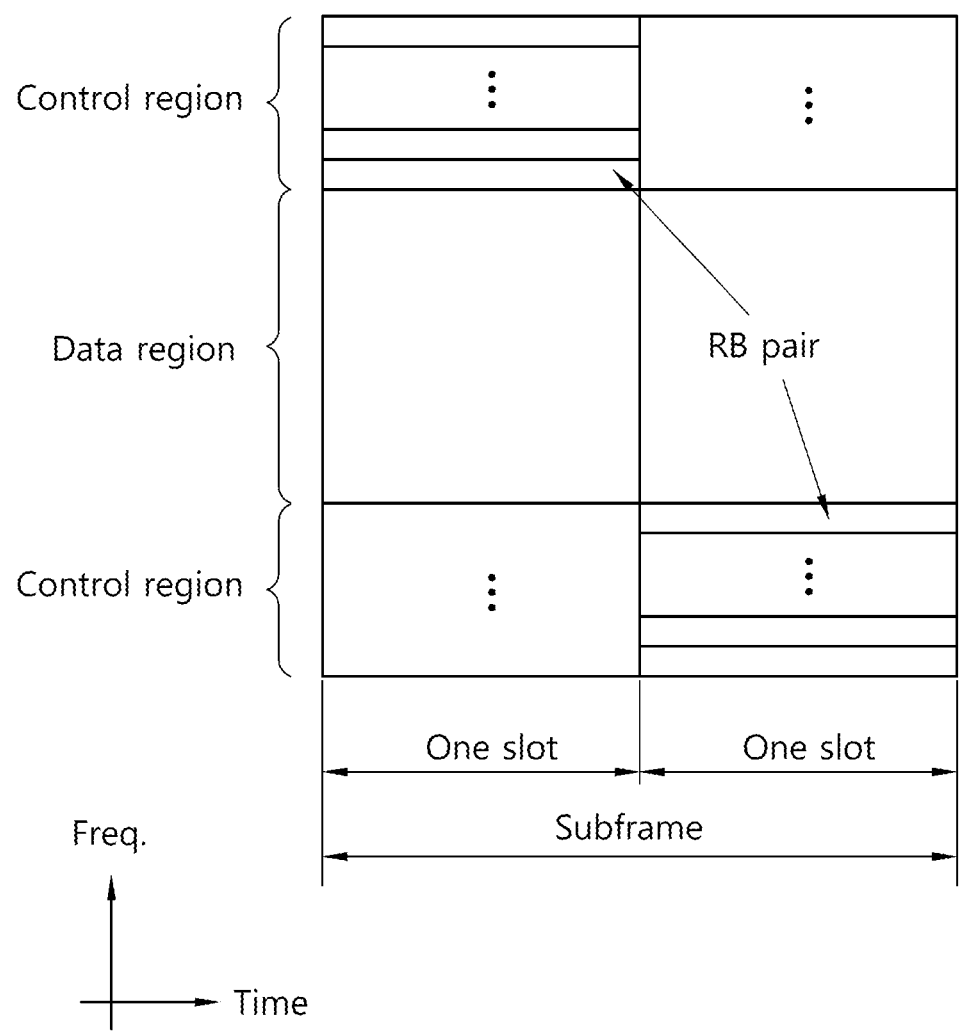
FIG. 5 shows the structure of an UL subframe.

FIG. 5 shows the structure of an UL subframe.

Referring to FIG. 5, the UL subframe can be divided into a control region to which a physical uplink control channel (PUSCH) for carrying uplink control information is allocated and a data region to which a physical uplink shared channel (PUSCH) for carrying user data is allocated in the frequency domain.

A PUCCH is allocated with an RB pair in a subframe. RBs that belong to an RB pair occupy different subcarriers in a first slot and a second slot. An RB pair has the same RB index m.

In accordance with 3GPP TS 36.211 V8.7.0, a PUCCH supports multiple formats. A PUCCH having a different number of bits in each subframe can be used according to a modulation scheme that is dependent on a PUCCH format.

Table 2 below shows an example of modulation schemes and the number of bits per subframe according to PUCCH formats.

TABLE 2

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

The PUCCH format 1 is used to send a Scheduling Request (SR), the PUCCH formats 1a/1b are used to send an ACK/NACK signal for an HARQ, the PUCCH format 2 is used to send a CQI, and the PUCCH formats 2a/2b are used to send a CQI and an ACK/NACK signal at the same time. When only an ACK/NACK signal is transmitted in a subframe, the PUCCH formats 1a/1b are used. When only an SR is transmitted, the PUCCH format 1 is used. When an SR and an ACK/NACK signal are transmitted at the same time, the PUCCH format 1 is used. In this case, the ACK/NACK signal is modulated into resources allocated to the SR and is then transmitted.

All the PUCCH formats use the Cyclic Shift (CS) of a sequence in each OFDM symbol. A CS sequence is generated by cyclically shifting a base sequence by a specific CS amount. The specific CS amount is indicated by a CS index.

An example in which a base sequence $r_u(n)$ has been defined is the same as the following equation.

$$r_u(n) = e^{jb(n)\pi/4} \qquad \text{[Equation 1]}$$

Here, u is a root index, n is an element index wherein $0 \le n \le N-1$, and N is the length of the base sequence. b(n) is defined in section 5.5 of 3GPP TS 36.211 V8.7.0.

The length of a sequence is the same as the number of elements included in the sequence. U can be determined by a cell identifier (ID), a slot number within a radio frame, etc.

Assuming that a base sequence is mapped to one resource block in the frequency domain, the length N of the base sequence becomes 12 because one resource block includes 12 subcarriers. A different base sequence is defined depending on a different root index.

A CS sequence $r(n, I_{cs})$ can be generated by cyclically shifting the base sequence r(n) as in Equation 2.

$$r(n, I_{cs}) = r(n) \cdot \exp\left(\frac{j2\pi I_{cs} n}{N}\right), \qquad \text{[Equation 2]}$$
$$0 \le I_{cs} \le N-1$$

Here, $I_{cs}$ is a CS index indicative of a CS amount ($0 \le I_{cs} \le N-1$).

An available CS index of a base sequence refers to a CS index that can be derived from the base sequence according to a CS interval. For example, the length of a base sequence is 12 and a CS interval is 1, a total number of available CS indices of the base sequence becomes 12. Or, if the length of a base sequence is 12 and a CS interval is 2, a total number of available CS indices of the base sequence becomes 6.

Figure 6:
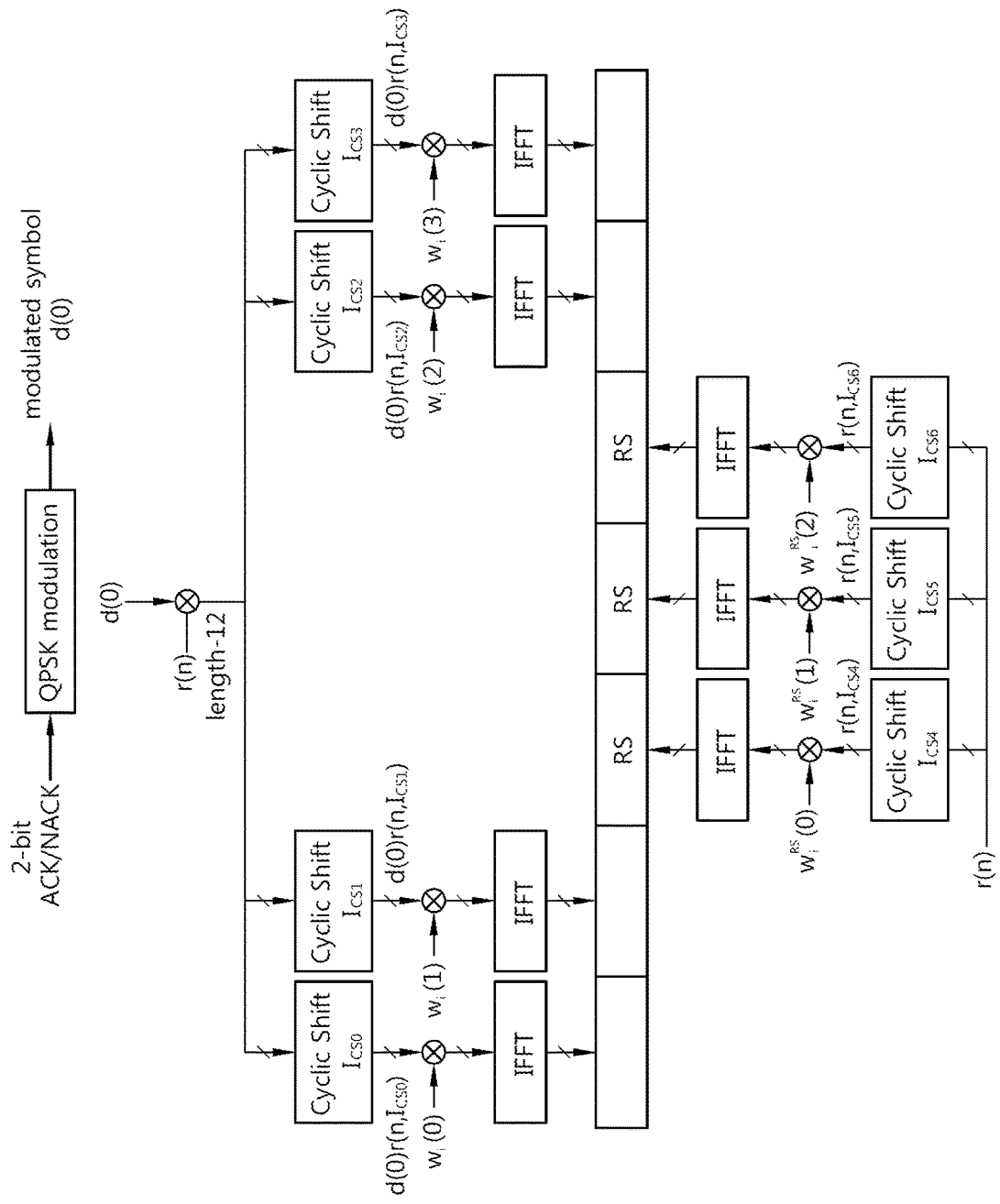
FIG. 6 shows the channel structure of a PUCCH format 1b in a normal CP.

FIG. 6 shows the channel structure of the PUCCH format 1b in a normal CP.

One slot includes 7 OFDM symbols, the 3 OFDM symbols become Reference Signal (RS) OFDM symbols for a reference signal, and the 4 OFDM symbols become data OFDM symbols for an ACK/NACK signal.

In the PUCCH format 1b, a modulation symbol d(0) is generated by performing Quadrature Phase Shift Keying (QPSK) modulation on an encoded 2-bit ACK/NACK signal.

A CS index $I_{cs}$ can vary depending on a slot number 'ns' within a radio frame and/or a symbol index 'l' within a slot.

In a normal CP, 4 data OFDM symbols for sending an ACK/NACK signal are present in one slot. It is assumed that corresponding CS indices in respective data OFDM symbols are $I_{cs0}$, $I_{cs1}$, $I_{cs2}$, and $I_{cs3}$.

The modulation symbol d(0) is spread into a CS sequence r(n,Ics). Assuming that a 1-dimensional spread sequence corresponding to an $(i+1)^{th}$ OFDM symbol is m(i) in a slot, $\{m(0), m(1), m(2), m(3)\}=\{d(0)r(n,I_{cs0}), d(0)r(n,I_{cs1}), d(0)r(n,I_{cs2}), d(0)r(n,I_{cs3})\}$ can be obtained.

In order to increase a UE capacity, the 1-dimensional spread sequence can be spread using an orthogonal sequence. The following sequence is used as an orthogonal sequence $w_i(k)$ (i is a sequence index, $0 \le k \le K-1$) wherein a spreading factor K=4.

TABLE 3

| Index (i) | [$w_i(0)$, $w_i(1)$, $w_i(2)$, $w_i(3)$] |
|---|---|
| 0 | [+1, +1, +1, +1] |
| 1 | [+1, −1, +1, −1] |
| 2 | [+1, −1, −1, +1] |

The following sequence is used as an orthogonal sequence $w_i(k)$ (i is a sequence index, $0 \le k \le K-1$) wherein a spreading factor K=3.

TABLE 4

| Index (i) | [$w_i(0)$, $w_i(1)$, $w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spreading factor can be used in each slot.

Accordingly, assuming that a specific orthogonal sequence index i is given, 2-dimensional spread sequences $\{s(0), s(1), s(2), s(3)\}$ can be expressed as follows.

$\{s(0), s(1), s(2), s(3)\}=\{w_i(0)m(0), w_i(1)m(1), w_i(2)m(2), w_i(3)m(3)\}$

The 2-dimensional spread sequences $\{s(0), s(1), s(2), s(3)\}$ are subject to IFFT and then transmitted in a corresponding OFDM symbol. Accordingly, an ACK/NACK signal is transmitted on a PUCCH.

A reference signal having the PUCCH format 1b is also transmitted by spreading the reference signal into an orthogonal sequence after cyclically shifting a base sequence r(n). Assuming that CS indices corresponding to 3 RS OFDM symbols are $I_{cs4}$, $I_{cs5}$, and $I_{cs6}$, 3 CS sequences $r(n,I_{cs4})$, $r(n,I_{cs5})$, $r(n,I_{cs6})$ can be obtained. The 3 CS sequences are spread into an orthogonal sequence $w^{RS}_i(k)$ wherein K=3.

An orthogonal sequence index i, a CS index $I_{cs}$, and an RB index m are parameters necessary to configure a PUCCH and are also resources used to classify PUCCHs (or MSs). If the number of available CSs is 12 and the number of available orthogonal sequence indices is 3, a PUCCH for a total of 36 MSs can be multiplexed with one RB.

In 3GPP LTE, a resource index $n^{(1)}_{PUCCH}$ is defined so that UE can obtain the three parameters for configuring a PUCCH. The resource index $n^{(1)}_{PUCCH}=n_{CCE}+N^{(1)}_{PUCCH}$, wherein $n_{CCE}$ is the number of the first CCE used to send a corresponding PDCCH (i.e., PDCCH including the allocation of DL resources used to received downlink data corresponding to an ACK/NACK signal), and $N^{(1)}_{PUCCH}$ is a parameter that is informed of UE by a BS through a higher layer message.

Time, frequency, and code resources used to send an ACK/NACK signal are called ACK/NACK resources or PUCCH resources. As described above, an index of ACK/NACK resources (called an ACK/NACK resource index or PUCCH index) used to send an ACK/NACK signal on a PUCCH can be represented as at least one of an orthogonal sequence index i, a CS index $I_{cs}$, an RB index m, and an index for calculating the 3 indices. ACK/NACK resources can include at least one of an orthogonal sequence, a CS, a resource block, and a combination of them.

Figure 7:
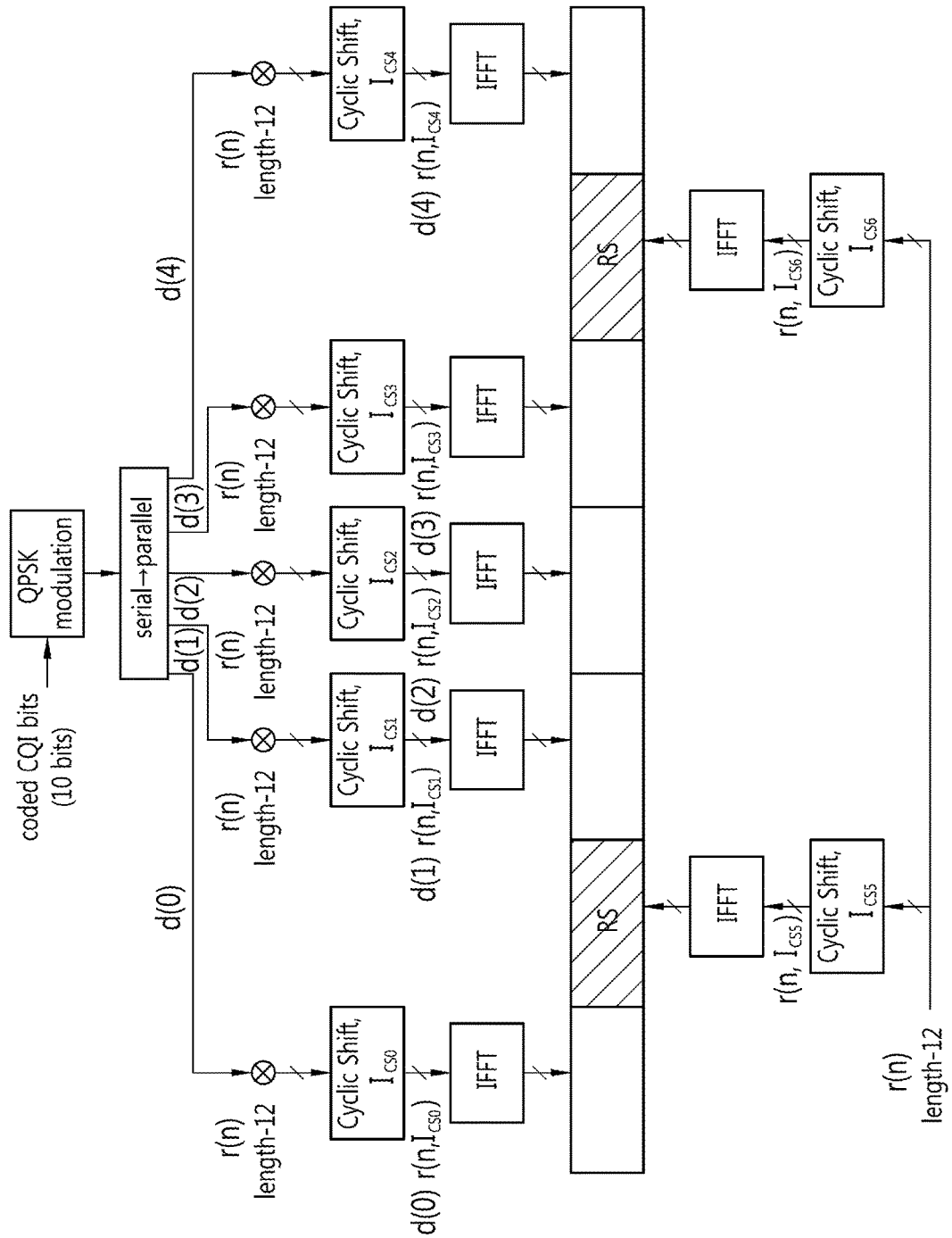
FIG. 7 shows the channel structure of PUCCH formats 2/2a/2b in a normal CP.

FIG. 7 shows the channel structure of the PUCCH formats 2/2a/2b in a normal CP.

Referring to FIG. 7, in a normal CP, OFDM symbols 1 and 5 (i.e., second and sixth OFDM symbols) are used to send a demodulation reference signal (DM RS), that is, an uplink reference signal, and the remaining OFDM symbols are used to send a CQI. In the case of an extended CP, an OFDM symbol 3 (fourth symbol) is used for a DM RS.

CQI information bits can be subject to channel coding at a ½ code rate, for example, thus becoming 20 coded bits. Reed-Muller code can be used in the channel coding. Next, the 20 coded bits are scramble and then subject to QPSK constellation mapping, thereby generating a QPSK modulation symbol (d(0) to d(4) in a slot 0). Each QPSK modulation symbol is modulated in a cyclic shift of a base RS sequence 'r(n)' having a length of 12, subject to IFFT, and then transmitted in each of 10 SC-FDMA symbols within a subframe. Uniformly spaced 12 CSs enable 12 different MSs to be orthogonally multiplexed in the same PUCCH RB. A base RS sequence 'r(n)' having a length of 12 can be used as a DM RS sequence applied to OFDM symbols 1 and 5.

Figure 8:
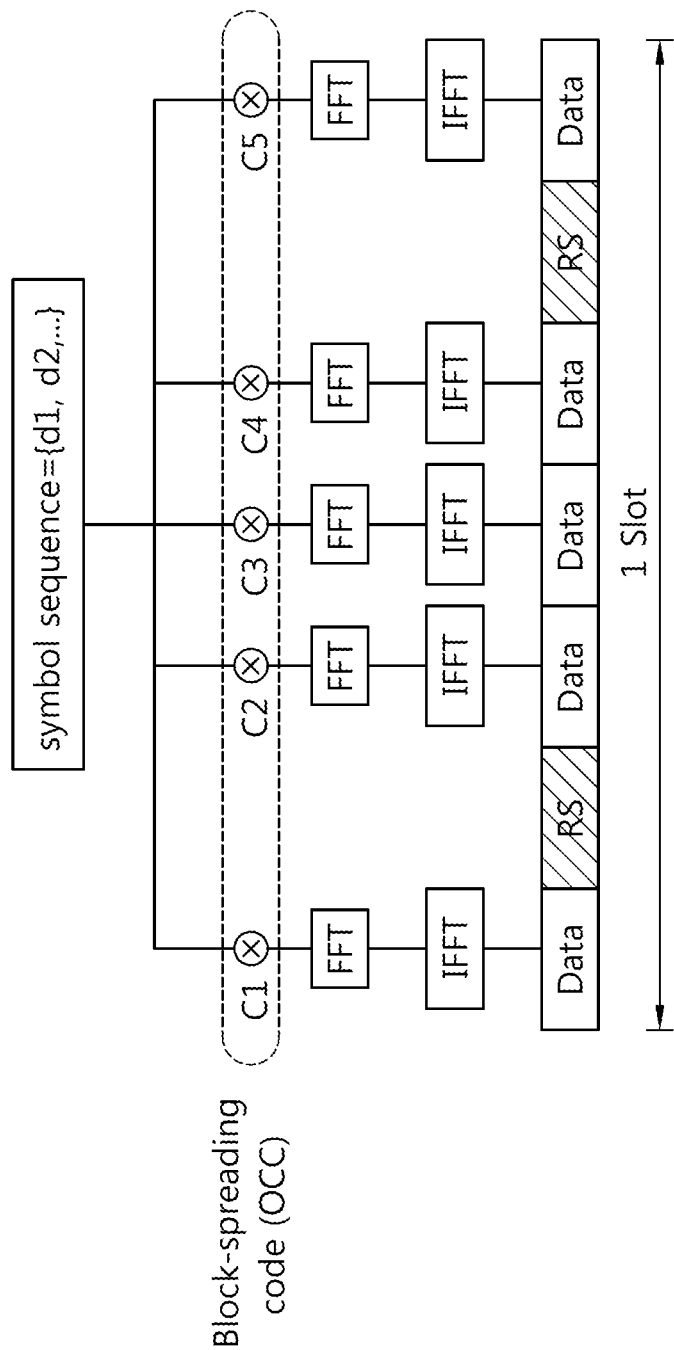
FIG. 8 illustrates the channel structure of a PUCCH format 3.

FIG. 8 shows an example of a channel structure of a PUCCH format 3.

Referring to FIG. 8, the PUCCH format 3 is a PUCCH format which uses a block spreading scheme. The block spreading scheme means a method of spreading a symbol sequence, which is obtained by modulating a multi-bit ACK/NACK, in a time domain by using a block spreading code.

In the PUCCH format 3, a symbol sequence (e.g., ACK/NACK symbol sequence) is transmitted by being spread in the time domain by using the block spreading code. An orthogonal cover code (OCC) may be used as the block spreading code. Control signals of several UEs may be multiplexed by the block spreading code. In the PUCCH format 2, a symbol (e.g., d(0), d(1), d(2), d(3), d(4), etc., of FIG. 7) transmitted in each data symbol is different, and UE multiplexing is performed using the cyclic shift of a constant amplitude zero auto-correlation (CAZAC) sequence. In contrast, in the PUCCH format 3, a symbol sequence including one or more symbols is transmitted in a frequency domain of each data symbol, the symbol sequence is spread in a time domain by using the block spreading code, and UE multiplexing is performed. An example in which 2 RS symbols are used in one slot has been illustrated in FIG. 8, but the present invention is not limited thereto. 3 RS symbols may be used, and an OCC having a spreading factor value of 4 may be used. An RS symbol may be generated from a CAZAC sequence having a specific cyclic shift and may be transmitted in such a manner that a plurality of RS symbols in the time domain has been multiplied by a specific OCC.

Now, a carrier aggregation system is described. The carrier aggregation system is also called a multiple carrier system.

A 3GPP LTE system supports a case where a DL bandwidth and a UL bandwidth are differently configured, but one component carrier (CC) is a precondition in this case. A 3GPP LTE system supports a maximum of 20 MHz and may be different in a UL bandwidth and a DL bandwidth, but supports only one CC in each of UL and DL.

A carrier aggregation (also called a bandwidth aggregation or a spectrum aggregation) supports a plurality of CCs. For example, if 5 CCs are allocated as the granularity of a carrier unit having a 20 MHz bandwidth, a maximum of a 100 MHz bandwidth may be supported.

Figure 9:
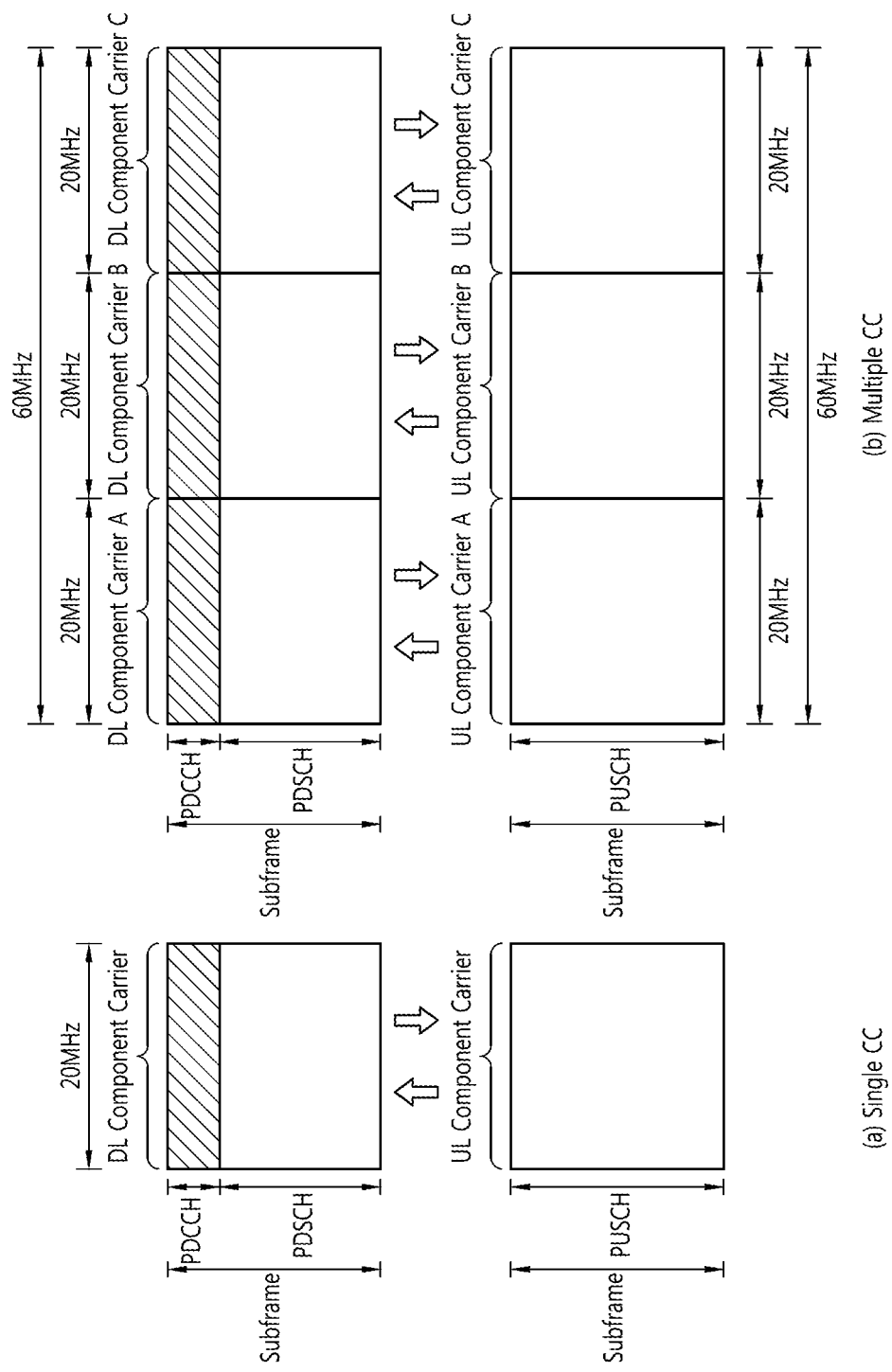
FIG. 9 shows an example of a comparison between a single carrier system and a carrier aggregation system.

FIG. 9 shows an example of a comparison between a single carrier system and a carrier aggregation system.

A carrier aggregation system (FIG. 9 (b)) has been illustrated as including three DL CCs and three UL CCs, but the number of DL CCs and UL CCs is not limited. A PDCCH and a PDSCH may be independently transmitted in each DL CC, and a PUCCH and a PUSCH may be independently transmitted in each UL CC. Or, a PUCCH may be transmitted only through a specific UL CC.

Since three pairs of DL CCs and UL CCs are defined, it can be said that a UE is served from three serving cells. Hereinafter, a cell which is configured to provide a service to a user equipment is referred to a serving cell.

The UE may monitor PDCCHs in a plurality of DL CCs and receive DL transport blocks through the plurality of DL CCs at the same time. The UE may send a plurality of UL transport blocks through a plurality of UL CCs at the same time.

A pair of a DL CC #A and a UL CC #A may become a first serving cell, a pair of a DL CC #B and a UL CC #B may become a second serving cell, and a DL CC #C and a UL CC#C may become a third serving cell. Each serving cell may be identified by a cell index (CI). The CI may be unique within a cell or may be UE-specific.

The serving cell may be divided into a primary cell and a secondary cell. The primary cell is a cell on which the UE performs an initial connection establishment procedure or initiates a connection re-establishment procedure, or a cell designated as a primary cell in a handover process. The primary cell is also called a reference cell. The secondary cell may be configured after an RRC connection has been established and may be used to provide additional radio resources. At least one primary cell is always configured, and a secondary cell may be added/modified/released in response to higher layer signaling (e.g., an RRC message). The CI of the primary cell may be fixed. For example, the lowest CI may be designated as the CI of the primary cell.

The primary cell includes a downlink primary component carrier (DL PCC) and an uplink PCC (UL PCC) in view of a CC. The secondary cell includes only a downlink secondary component carrier (DL SCC) or a pair of a DL SCC and a UL SCC in view of a CC. Hereinafter, the term, 'cell' may be mixed with the term 'component carrier (CC)'.

As described above, the carrier aggregation system may support a plurality of CCs, that is, a plurality of serving cells unlike the single carrier system.

Such a carrier aggregation system may support cross-carrier scheduling. The cross-carrier scheduling is a scheduling method capable of performing resource allocation of a PDSCH transmitted through a different component carrier through a PDCCH transmitted through a specific component carrier and/or resource allocation of a PUSCH transmitted through other component carriers except for a component carrier fundamentally linked with the specific component carrier. That is, the PDCCH and the PDSCH may be transmitted through different DL CCs, and a PUSCH may be transmitted through a UL CC different from a UL CC linked with a DL CC to which a PDCCH including a UL is transmitted. As described above, in a system for supporting the cross-carrier scheduling, the PDCCH needs a carrier indicator indicating that PDSCH/PUSCH are transmitted through a certain DL CC/UL CC. Hereinafter, a field including the carrier indicator refers to a carrier indication field (CIF).

The carrier aggregation system that supports the cross-carrier scheduling may include a carrier indication field (CIF) to the conventional downlink control information (DCI). In a system that supports the cross-carrier scheduling, for example, LTE-A system, 3 bits may be extended since the CIF is added to the conventional DCI format (i.e., the DCI format used in LTE), and the PDCCH structure may reuse the conventional coding method, resource allocation method (i.e., resource mapping based on the CCE), and the like.

A BS may set a PDCCH monitoring DL CC (monitoring CC) group. The PDCCH monitoring DL CC group is configured by a part of all aggregated DL CCs. If the cross-carrier scheduling is configured, the UE performs PDCCH monitoring/decoding for only a DL CC included in the PDCCH monitoring DL CC group. That is, the BS transmits a PDCCH with respect to a PDSCH/PUSCH to be scheduled through only the DL CCs included in the PDCCH monitoring DL CC group. The PDCCH monitoring DL CC group may be configured in a UE-specific, UE group-specific, or cell-specific manner.

Non-cross carrier scheduling (NCSS) is a scheduling method capable of performing resource allocation of a PDSCH transmitted through a specific component carrier through a PDCCH transmitted through the specific component carrier and/or resource allocation of a PDSCH transmitted through a component carrier fundamentally linked with the specific component carrier.

ACK/NACK transmission for HARQ in 3GPP LTE Time Division Duplex (TDD) is described below.

In TDD, unlike in a Frequency Division Duplex (FDD), a DL subframe and an UL subframe coexist in one radio frame. In general, the number of UL subframes is smaller than that of DL subframes. Accordingly, in preparation for a case where UL subframes for sending an ACK/NACK signal are not sufficient, a plurality of ACK/NACK signals for DL transport blocks received in a plurality of DL subframes is transmitted in one UL subframe.

In accordance with section 10.1 of 3GPP TS 36.213 V8.7.0 (2009-05), two ACK/NACK modes: ACK/NACK bundling and ACK/NACK multiplexing are initiated.

In ACK/NACK bundling, UE sends ACK if it has successfully decoded all received PDSCHs (i.e., DL transport blocks) and sends NACK in other cases. To this end, ACK or NACKs for each PDSCH are compressed through logical AND operations.

ACK/NACK multiplexing is also called ACK/NACK channel selection (or simply channel selection). In accordance with ACK/NACK multiplexing, UE selects one of a plurality of PUCCH resources and sends ACK/NACK.

Table below shows DL subframes n−k associated with an UL subframe n according to an UL-DL configuration in 3GPP LTE, wherein k∈K and M is the number of elements of a set K.

TABLE 5

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

It is assumed that M DL subframes are associated with the UL subframe n and, for example, M=3. In this case, UE can obtain 3 PUCCH resources $n^{(1)}_{PUCCH,0}$, $n^{(1)}_{PUCCH,1}$, and $n^{(1)}_{PUCCH,2}$ because it can receive 3 PDCCHs from 3 DL subframes. In this case, an example of ACK/NACK channel selection is the same as the following table.

TABLE 6

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH, 2}$ | 1, 1 |
| ACK, ACK, NACK/DTX | $n^{(1)}_{PUCCH, 1}$ | 1, 1 |
| ACK, NACK/DTX, ACK | $n^{(1)}_{PUCCH, 0}$ | 1, 1 |
| ACK, NACK/DTX, NACK/DTX | $n^{(1)}_{PUCCH, 0}$ | 0, 1 |
| NACK/DTX, ACK, ACK | $n^{(1)}_{PUCCH, 2}$ | 1, 0 |
| NACK/DTX, ACK, NACK/DTX | $n^{(1)}_{PUCCH, 1}$ | 0, 0 |
| NACK/DTX, NACK/DTX, ACK | $n^{(1)}_{PUCCH, 2}$ | 0, 0 |
| DTX, DTX, NACK | $n^{(1)}_{PUCCH, 2}$ | 0, 1 |
| DTX, NACK, NACK/DTX | $n^{(1)}_{PUCCH, 1}$ | 1, 0 |
| NACK, NACK/DTX, NACK/DTX | $n^{(1)}_{PUCCH, 0}$ | 1, 0 |
| DTX, DTX, DTX | N/A | N/A |

In the above table, HARQ-ACK(i) indicates ACK/NACK for an $i^{th}$ DL subframe of M DL subframes. Discontinuous transmission (DTX) means that a DL transport block has not been received on a PDSCH in a corresponding DL subframe or that a corresponding PDCCH has not been detected. In accordance with Table 6, 3 PUCCH resources $n^{(1)}_{PUCCH,0}$, $n^{(1)}_{PUCCH,1}$, and $n^{(1)}_{PUCCH,2}$ are present, and b(0), b(1) are two bits transmitted using a selected PUCCH.

For example, when UE successfully receives all 3 DL transport blocks in 3 DL subframes, the UE performs QPSK modulation on bits (1,1) using $n^{(1)}_{PUCCH,2}$ and sends them on a PUCCH. If UE fails in decoding a DL transport block in a first (i=0) DL subframe, but succeeds in decoding the remaining transport blocks, the UE sends bits (1,0) on a PUCCH using $n^{(1)}_{PUCCH,2}$. That is, in the existing PUCCH format 1b, only ACK/NACK of 2 bits can be transmitted. However, in channel selection, allocated PUCCH resources are linked to an actual ACK/NACK signal in order to indicate more ACK/NACK states. This channel selection is also referred to as channel selection using the PUCCH format 1b.

In ACK/NACK channel selection, if at least one ACK is present, NACK and DTX are coupled. This is because all ACK/NACK states cannot be represented by a combination of reserved PUCCH resources and a QPSK symbol. If ACK is not present, however, DTX is decoupled from NACK.

The above-described ACK/NACK bundling and ACK/NACK multiplexing can be applied in the case where one serving cell has been configured in UE in TDD.

For example, it is assumed that one serving cell has been configured (i.e., only a primary cell is configured) in UE in TDD, ACK/NACK bundling or ACK/NACK multiplexing is used, and M=1. That is, it is assumed that one DL subframe is associated with one UL subframe.

1) UE sends ACK/NACK in a subframe n if the UE detects a PDSCH indicated by a corresponding PDCCH in a subframe n−k of a primary cell or detects a Semi-Persistent Scheduling (SPS) release PDCCH. In LTE, a BS can inform UE that semi-persistent transmission and reception are performed in what subframes through a higher layer signal, such as Radio Resource Control (RRC). Parameters given by the higher layer signal can be, for example, the periodicity of a subframe and an offset value. When the UE receives the activation or release signal of SPS transmission through a PDCCH after recognizing semi-persistent transmission through the RRC signaling, the UE performs or releases SPS PDSCH reception or SPS PUSCH transmission. That is, the UE does not immediately perform SPS transmission/reception although SPS scheduling is allocated thereto through the RRC signaling, but when an activation or release signal is received through a PDCCH, performs SPS transmission/reception in a subframe that corresponds to frequency resources (resource block) according to the allocation of the resource block designated by the PDCCH, modulation according to MCS information, a subframe periodicity allocated through the RRC signaling according to a code rate, and an offset value. Here, a PDCCH that releases SPS is called an SPS release PDCCH, and a DL SPS release PDCCH that releases DL SPS transmission requires the transmission of an ACK/NACK signal.

Here, in the subframe n, UE sends ACK/NACK using the PUCCH formats 1a/1b according to a PUCCH resource $n^{(1,p)}_{PUCCH}$. In $n^{(1,p)}_{PUCCH}$, p indicates an antenna port p. The k is determined by Table 5.

The PUCCH resource $n^{(1,p)}_{PUCCH}$ can be allocated as in the following equation. P can be p0 or p1.

$$n^{(1,p=p0)}_{PUCCH}=(M-m-1)\cdot N_c+m\cdot N_{c+1}+ \\ n_{CCE}+N^{(1)}_{PUCCH} \text{ for antenna port } p=p0,$$

$$n^{(1,p=p1)}_{PUCCH}=(M-m-1)\cdot N_c+m\cdot N_{c+1}+(n_{CCE}+1)+ \\ N^{(1)}_{PUCCH} \text{ for antenna port } p=p1, \quad \text{[Equation 3]}$$

In Equation 3, c is selected in such a way as to satisfy $N_c \le n_{CCE} < N_{c+1}$(antenna port p0), $N_c \le (n_{CCE}+1) < N_{c+1}$(antenna port p1) from among {0,1,2,3}. $N^{(1)}_{PUCCH}$ is a value set by a higher layer signal. $N_c=\max\{0, \text{floor}[N^{DL}_{RB}\cdot(N^{RB}_{sc}\cdot c-4)/36]\}$. The $N^{DL}_{RB}$ is a DL bandwidth, and $N^{RB}_{sc}$ is the size of an RB indicated by the number of subcarriers in the frequency domain. $n_{CCE}$ is a first CCE number used to send a corresponding PDCCH in a subframe n−km. m is a value that makes km the smallest value in the set K of Table 5.

2) If UE detects an SPS PDSCH, that is, a PDSCH not including a corresponding PDCCH, in the DL subframe n−k of a primary cell, the UE can send ACK/NACK in the subframe n using the PUCCH resource $n^{(1,p)}_{PUCCH}$ as follows.

Since an SPS PDSCH does not include a scheduling PDCCH, UE sends ACK/NACK through the PUCCH formats 1a/1b according to $n^{(1,p)}_{PUCCH}$ that is configured by a higher layer signal. For example, 4 resources (a first PUCCH resource, a second PUCCH resource, a third PUCCH resource, and a fourth PUCCH resource) can be reserved through an RRC signal, and one resource can be indicated through the Transmission Power Control (TPC) field of a PDCCH that activates SPS scheduling.

The following table is an example in which resources for channel selection are indicated by a TPC field value.

TABLE 7

| TPC field value | Resource for channel selection |
|---|---|
| '00' | First PUCCH resource |
| '01' | Second PUCCH resource |
| '10' | Third PUCCH resource |
| '11' | Fourth PUCCH resource |

For another example, it is assumed that in TDD, one serving cell is configured (i.e., only a primary cell is configured) in UE, ACK/NACK multiplexing is used, and M>1. That is, it is assumed that a plurality of DL subframes is associated with one UL subframe.

1) A PUCCH resource $n^{(1)}_{PUCCH,i}$ for sending ACK/NACK when UE receives a PDSCH in a subframe $n-k_i$ ($0 \le i \le M-1$) or detects a DL SPS release PDCCH can be allocated as in the following equation. Here, $k_i \in K$, and the set K has been described with reference to Table 5.

$$n^{(1)}_{PUCCH,i}=(M-i-1)\cdot N_c+i\cdot N_{c+1}+n_{CCE,i}+N^{(1)}_{PUCCH} \quad \text{[Equation 4]}$$

Here, c is selected from {0,1,2,3} so that $N_c \le n_{CCE,i} < N_{c+1}$ is satisfied. $N^{(1)}_{PUCCH}$ is a value set by a higher layer signal.

$N_C=\max\{0, \text{floor}[N^{DL}_{RB} \cdot (N^{RB}_{sc} \cdot c-4)/36]\}$. The $N^{DL}_{RB}$ is a DL bandwidth, and $N^{RB}_{sc}$ is the size of an RB indicated by the number of subcarriers in the frequency domain. $n_{CCE,i}$ is a first CCE number used to send a corresponding PDCCH in the subframe $n-k_i$.

2) If UE receives a PDSCH (i.e., SPS PDSCH) not having a corresponding PDCCH in the subframe, $n^{(1)}_{PUCCH,i}$ is determined by a configuration given by a higher layer signal and Table 7.

If two or more serving cells have been configured in UE in TDD, the UE sends ACK/NACK using channel selection that uses the PUCCH format 1b or the PUCCH format 3. Channel selection that uses the PUCCH format 1b used in TDD can be performed as follows.

If a plurality of serving cells using channel selection that uses the PUCCH format 1b has been configured, when ACK/NACK bits are greater than 4 bits, UE performs spatial ACK/NACK bundling on a plurality of codewords within one DL subframe and sends spatially bundled ACK/NACK bits for each serving cell through channel selection that uses the PUCCH format 1b. Spatial ACK/NACK bundling means the compression of ACK/NACK for each codeword through logical AND operations within the same DL subframe.

If ACK/NACK bits are 4 bits or lower, spatial ACK/NACK bundling is not used and the ACK/NACK bits are transmitted through channel selection that uses the PUCCH format 1b.

If 2 or more serving cells using the PUCCH format 3 have been configured in UE, when ACK/NACK bits are greater than 20 bits, spatial ACK/NACK bundling can be performed in each serving cell and ACK/NACK bits subjected to spatial ACK/NACK bundling can be transmitted through the PUCCH format 3. If ACK/NACK bits are 20 bits or lower, spatial ACK/NACK bundling is not used and the ACK/NACK bits are transmitted through the PUCCH format 3.

<Channel Selection Using the PUCCH Format 1b Used in FDD>

If two serving cells using FDD have been configured in UE, ACK/NACK can be transmitted through channel selection that uses the PUCCH format 1b. The UE can feed ACK/NACK for a maximum of 2 transport blocks, received in one serving cell, back to a BS by sending 2-bit (b(0)b(1)) information in one PUCCH resource selected from a plurality of PUCCH resources. One codeword can be transmitted in one transport block. A PUCCH resource can be indicated by a resource index $n^{(1)}_{PUCCH,i}$. Here, A is any one of {2, 3, 4}, and i is $0 \le i \le (A-1)$. The 2-bit information is indicated as b(0)b(1).

HARQ-ACK(j) indicates an HARQ ACK/NACK response that is related to a transport block or DL SPS release PDCCH transmitted by a serving cell. The HARQ-ACK(j), the serving cell, and the transport block can have the following mapping relationship.

TABLE 8

| | HARQ-ACK(j) | | | |
|---|---|---|---|---|
| A | HARQ-ACK(0) | HARQ-ACK(1) | HARQ-ACK(2) | HARQ-ACK(3) |
| 2 | Transport block 1 of primary cell | Transport block 2 of secondary cell | NA | NA |
| 3 | Transport block 1 of serving cell 1 | Transport block 2 of serving cell 1 | Transport block 3 of serving cell 2 | NA |
| 4 | Transport block 1 of primary cell | Transport block 2 of primary cell | Transport block 3 of secondary cell | Transport block 4 of secondary cell |

In Table 8, for example, in the case of A=4, HARQ-ACK(0) and HARQ-ACK(1) indicate ACK/NACKs for 2 transport blocks transmitted in a primary cell, and HARQ-ACK(2) and HARQ-ACK(3) indicate ACK/NACKs for 2 transport blocks transmitted in a secondary cell.

When UE receives a PDSCH or detects a DL SPS release PDCCH by detecting a PDCCH in a subframe 'n-4' of a primary cell, the UE sends ACK/NACK using a PUCCH resource $n^{(1)}_{PUCCH,i}$. Here, $n^{(1)}_{PUCCH,i}$ is determined to be $n_{CCE,i}+N^{(1)}_{PUCCH}$. Here, $n_{CCE,i}$ means an index of the first CCE that is used to send a PDCCH by a BS, and $N^{(1)}_{PUCCH}$ is a value set through a higher layer signal. If a transmission mode of a primary cell supports up to two transport blocks, a PUCCH resource $n^{(1)}_{PUCCH,i+1}$ is given. Here, $n^{(1)}_{PUCCH,i+1}$ can be determined to be $n_{CCE,i}+1+N^{(1)}_{PUCCH}$. That is, if a primary cell is set in a transmission mode in which a maximum of up to 2 transport blocks can be transmitted, 2 PUCCH resources can be determined.

If a PDCCH detected in a subframe 'n-4' of a primary cell is not present, a PUCCH resources $n^{(1)}_{PUCCH,i}$ for sending ACK/NACK for a PDSCH is determined by a higher layer configuration. If up to 2 transport blocks are supported, a PUCCH resource $n^{(1)}_{PUCCH,i+1}$ can be given as $n^{(1)}_{PUCCH,i+1}=n^{(1)}_{PUCCH,i+1}$.

If a PDSCH is received in a secondary cell by detecting a PDCCH in a subframe 'n-4', PUCCH resources $n^{(1)}_{PUCCH,i}$ and $n^{(1)}_{PUCCH,i+1}$ for a transmission mode in which up to 2 transport blocks are supported can be determined by a higher layer configuration.

Meanwhile, in the prior art, it was a precondition that a plurality of serving cells configured in a UE uses radio frames having the same type. For example, it was a precondition that all of a plurality of serving cells configured in the UE use FDD frames or use TDD frames. In the next-generation wireless communication system, however, different types of radio frames may be used respectively in serving cells.

Figure 10:
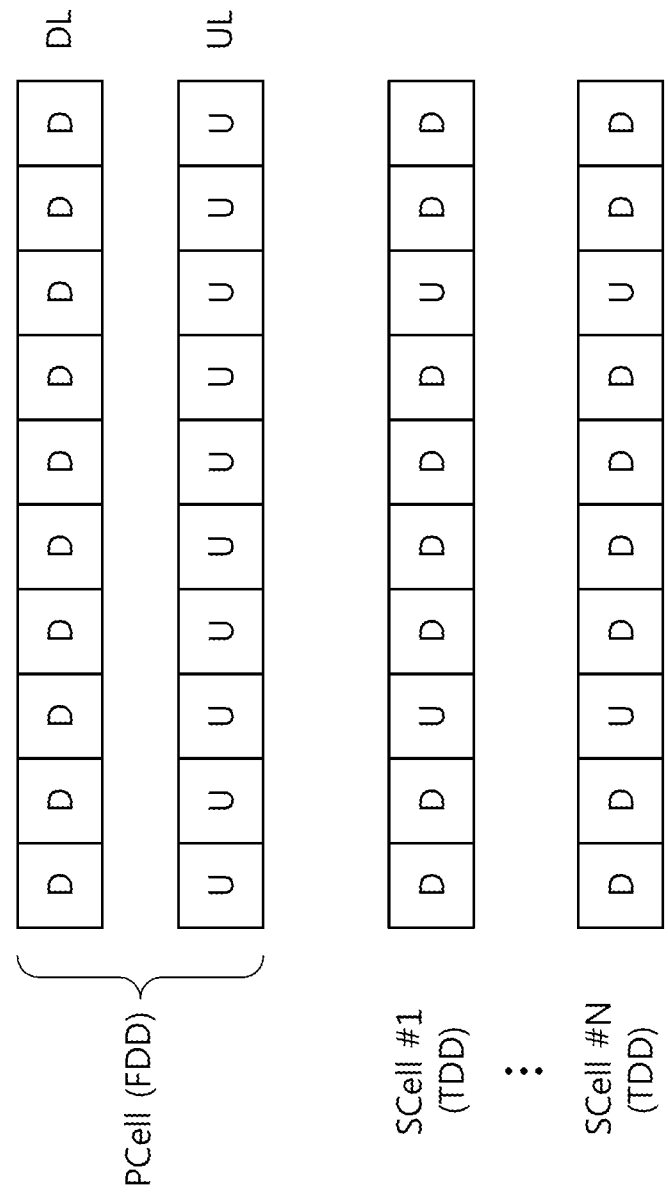
FIG. 10 shows one example in which a plurality of serving cells uses different types of radio frames in a wireless communication system.

FIG. 10 shows one example in which a plurality of serving cells use different types of radio frames in a wireless communication system.

Referring to FIG. 10, a primary cell PCell and a plurality of secondary cells SCell #1, . . . SCell #N may be configured in a UE. In this case, the primary cell may operate in FDD and use an FDD frame, and the secondary cells may operate in TDD and use TDD frames. The same UL-DL configuration may be used in the plurality of secondary cells. A DL subframe (indicated by D) and a UL subframe (indicated by U) are present in a 1:1 manner in the primary cell, but a DL subframe and a UL subframe may be present in a different ratio other than 1:1 in the secondary cells.

Table 9 below shows that ACK/NACK is transmitted in what a subframe according to a UL-DL configuration when one serving cell operates in TDD. Table 9 is equivalent to Table 5.

TABLE 9

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | — | | 4 | 6 | | — | | |
| 1 | 7 | 6 | | 4 | 7 | 6 | | | | 4 |
| 2 | 7 | 6 | 4 | 8 | 7 | 6 | | | 4 | 8 |
| 3 | 4 | 11 | | | 7 | 6 | <u>6</u> | <u>5</u> | <u>5</u> | |
| 4 | 12 | 11 | | 8 | 7 | <u>7</u> | <u>6</u> | <u>5</u> | 4 | |
| 5 | 12 | 11 | 9 | 8 | 7 | 6 | <u>5</u> | 4 | 13 | |
| 6 | <u>7</u> | <u>7</u> | | | 7 | <u>7</u> | | | | <u>5</u> |

In Table 9, when a UE receives a PDSCH or a PDCCH (e.g., DL SPS release PDCCH) necessary for an ACK/NACK response in a subframe n, the UE sends ACK/NACK in a subframe n+k(n). Each of the values of Table 9 indicates the k(n) value. For example, Table 9 indicates that if a UL-DL configuration is 0 and a PDSCH is received in a subframe 0, ACK/NACK is transmitted after four subframes elapse, i.e., in a subframe 4. A specific time is necessary in order for the UE to send ACK/NACK after receiving a PDSCH or a DL SPS release PDCCH. A minimum value of this specific time is hereinafter indicated as $k_{min}$, and a value of $k_{min}$ may be four subframes. Four subframes, which is the minimum value of the specific time, are determined by considering a propagation delay between the transmission terminal and the reception terminal, a processing time which is required for decoding at the reception terminal. When looking at the timing of transmitting ACK/NACK in Table 9 above, the ACK/NACK is mainly transmitted in the first uplink subframe after a lapse of $k_{min}$. However, the underlined figures do not indicate the first uplink subframe after a lapse of $k_{min}$, but indicate the uplink subframe which is located at the next position. The reason for this is to prevent from transmitting the ACK/NACK for too many downlink subframes in one uplink subframe.

Meanwhile, since a UL subframe: DL subframe ratio is always 1:1 in FDD, ACK/NACK timing is determined as shown in the following table.

TABLE 9-1

| Frame Structure | Subframe n | | | | | | | | | |
|---|---|---|---|---|---|---|---|---|---|---|
| | 0 | 1 | 2 | 3 | 4 | 5 | 6 | 7 | 8 | 9 |
| FDD | 4 | 4 | 4 | 4 | 4 | 4 | 4 | 4 | 4 | 4 |

That is, as shown in the above Table, $k(n)=k_{min}=4$ for all subframes.

Meanwhile, in the prior art, it was a precondition that all serving cells use radio frames having the same type, and ACK/NACK transmission timing, that is, HARQ timing, was determined based on this assumption. However, if a plurality of serving cells use different types of radio frames, it is necessary to determine which method will be used to transmit ACK/NACK.

It is hereinafter assumed that a primary cell and at least one secondary cell are configured in a UE in a wireless communication system. It is also assumed that the primary cell uses an FDD frame and the secondary cell uses a TDD frame. Any one of the UL-DL configurations of Table 1 may be used in the TDD frame. Hereinafter, only a relationship between a primary cell and one secondary cell is illustrated, for convenience of description, but this relationship may be applied to a relationship between a primary cell and each of a plurality of secondary cells when the plurality of secondary cells are configured in the UE.

Under this assumption, first, a method of transmitting ACK/NACK for downlink data received through a primary cell is described below. Hereinafter, the downlink data generally indicates a PDSCH that requests an ACK/NACK response, a codeword included in a PDSCH, a DL SPS release PDCCH indicating a DL SPS release and the like.

Figure 11:
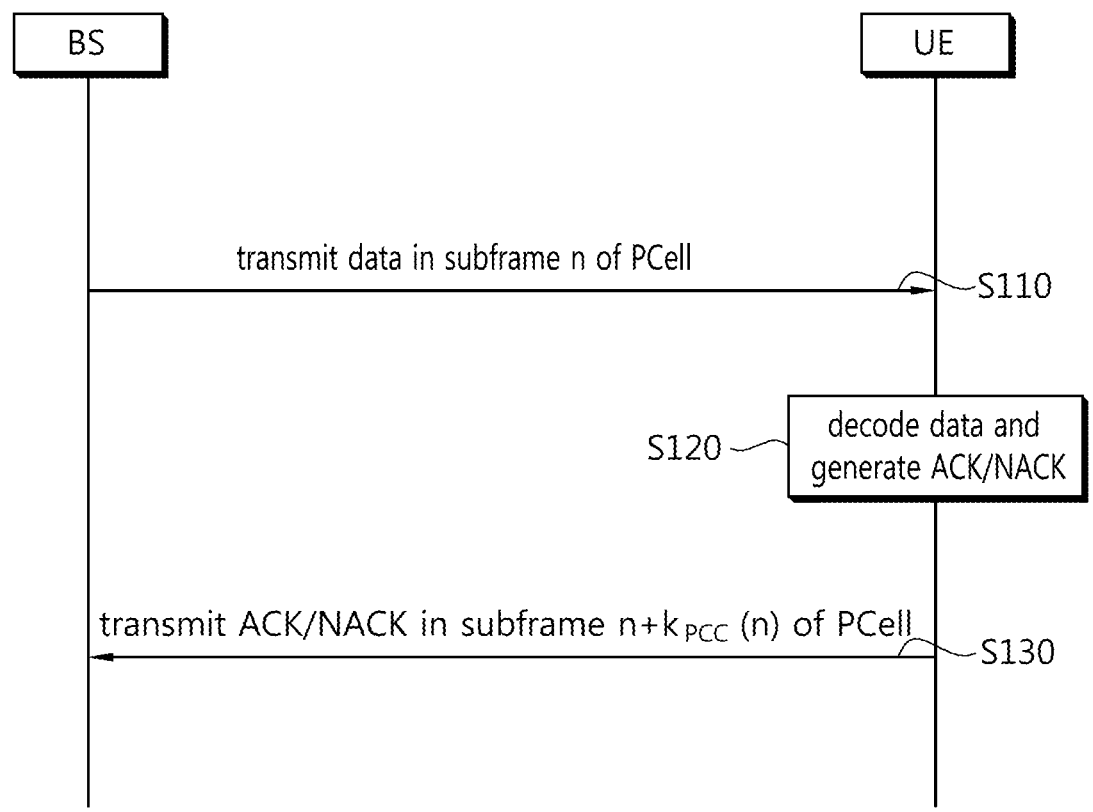
FIG. 11 shows a method of transmitting ACK/NACK for downlink data received through a primary cell.

FIG. 11 shows a method of transmitting ACK/NACK for downlink data received through a primary cell.

Referring to FIG. 11, a BS sends downlink data in a subframe n of a primary cell (S110). From a view of a UE, the downlink data is received in a subframe n of a DL PCC of the primary cell.

The UE decodes the downlink data and generates ACK/NACK for the downlink data (S120).

The UE sends the ACK/NACK in a subframe n+$k_{PCC}$(n) of the primary cell (S130).

The subframe n+$k_{PCC}$(n) of the primary cell is a subframe after a minimum delay time (this is called $k_{min}$) necessary for an ACK/NACK response has elapsed from a point of time at which the downlink data was received. Here, the minimum delay time $k_{min}$ may be four subframes. Accordingly, the UE may send the ACK/NACK in a subframe n+4 of a UL PCC of the primary cell.

That is, in the primary cell, as in the case where an HARQ is performed in conventional FDD, the ACK/NACK is transmitted in a subframe after four subframes elapse from a subframe in which data was received.

Now, a method of sending ACK/NACK when a UE receives downlink data in a secondary cell is described.

Figure 12:
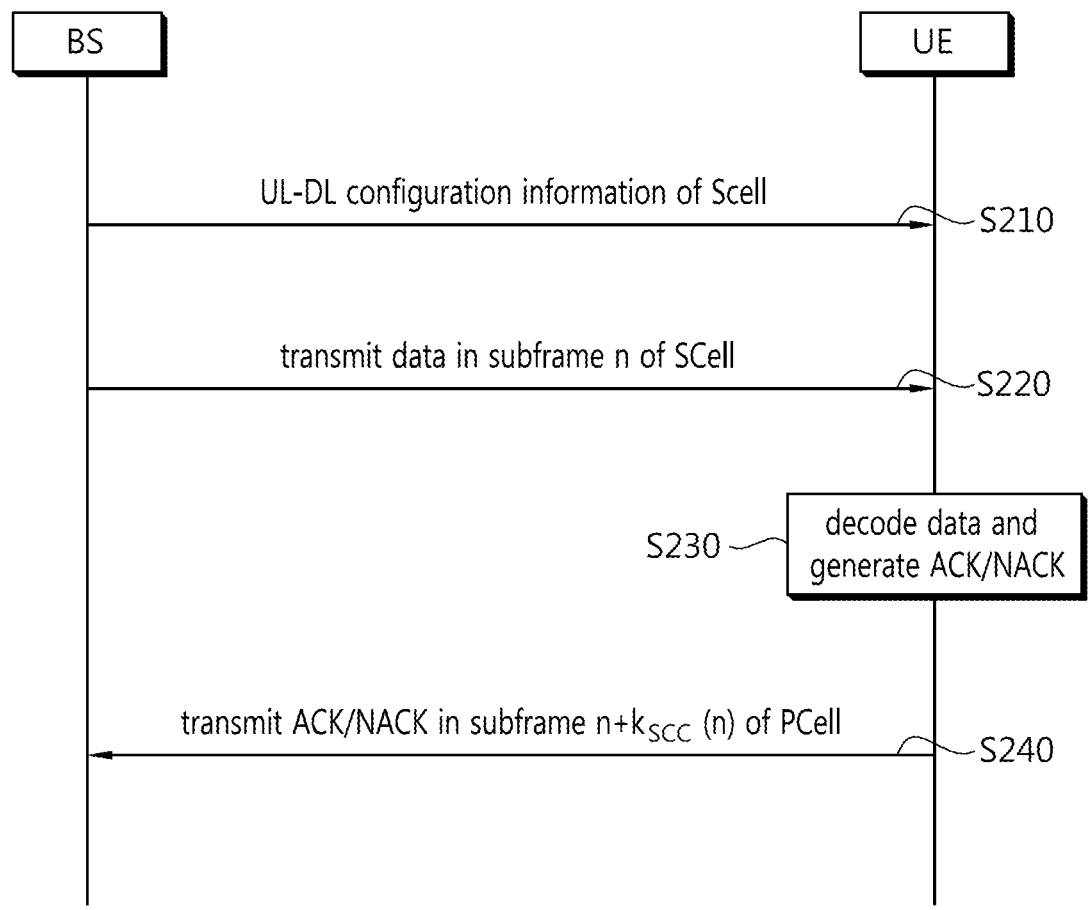
FIG. 12 shows a method of transmitting ACK/NACK for downlink data received through a secondary cell.

FIG. 12 shows a method of transmitting ACK/NACK for downlink data received through a secondary cell.

Referring to FIG. 12, a BS sends information about a UL-DL configuration of the secondary cell (S210). The secondary cell may need the UL-DL configuration information because it operates in TDD. The UL-DL configuration information may be transmitted through a higher layer signal, such as an RRC message.

A BS sends downlink data in a subframe n of the secondary cell (S220).

The UE decodes the downlink data and generates ACK/NACK for the downlink data (S230).

The UE may send the ACK/NACK to the BS through a subframe n+$k_{SCC}(n)$ of a primary cell (S240). The subframe n+$k_{SCC}(n)$ may be determined by the following method.

<HARQ ACK/NACK Transmission Timing in System in Which CCs Using Different Frame Structures are Aggregated>

<Method 1>

Method 1 is a method in which a subframe n+$k_{SCC}(n)$ complies with ACK/NACK transmission timing in a primary cell. That is, Method 1 is a method of configuring a UL subframe of the primary cell equal to n+$k_{min}$ as the subframe n+$k_{SCC}(n)$. In other words, if data is received in a subframe n of a secondary cell, ACK/NACK for the data is transmitted in the subframe n+$k_{min}$ of the primary cell. Here, $k_{min}$ may be, for example, four subframes.

Figure 13:
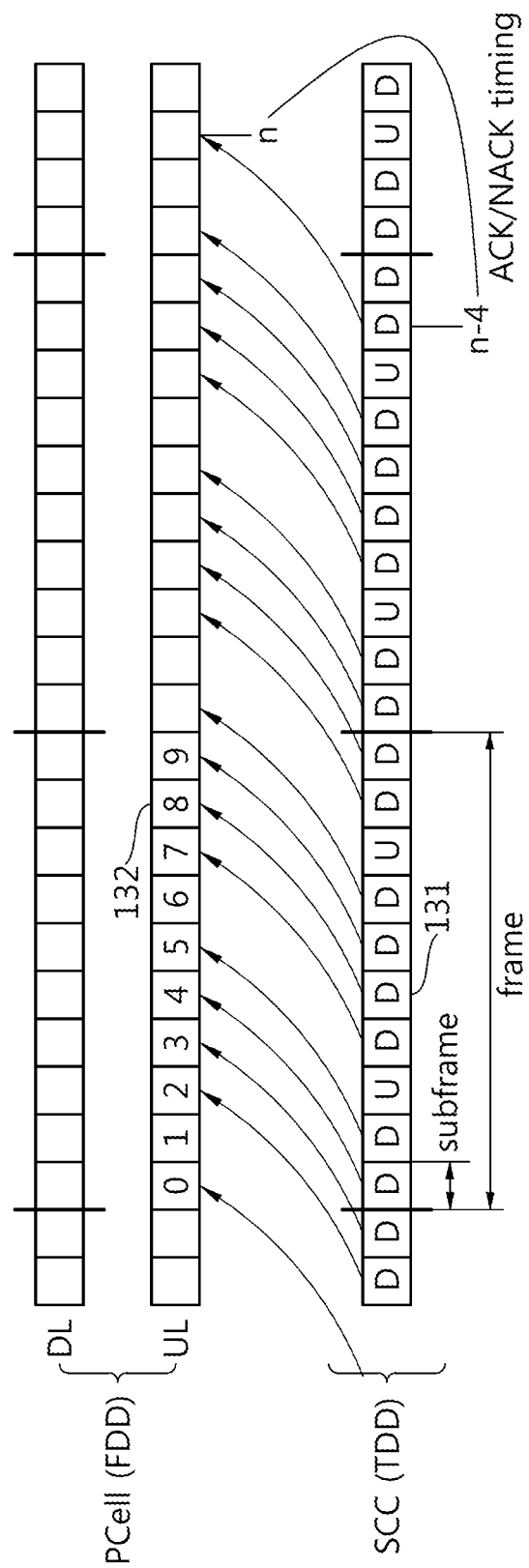
FIG. 13 shows an example of ACK/NACK transmission timing when a primary cell is an FDD cell and a secondary cell is a TDD cell.

FIG. 13 shows an example of ACK/NACK transmission timing when a primary cell is an FDD cell and a secondary cell is a TDD cell.

Referring to FIG. 13, it is assumed that a UL subframe of PCC in which ACK/NACK is transmitted for a DL data channel or DL control channel received in a DL subframe n of PCC is a subframe n+$k_{PCC}(n)$. In case of FDD, to avoid an ACK/NACK transmission delay, it may be set to $k_{PCC}(n)=k_{min}=4$ similarly in the conventional way.

It is assumed that a UL subframe of PCC in which ACK/NACK is transmitted for a DL data channel or DL control channel received in a DL subframe n of SCC is a subframe n+$k_{SCC}(n)$. Then, $k_{SCC}(n)$ may comply with ACK/NACK timing of FDD configured in PCC. That is, it may be set to $k_{SCC}(n)=k_{min}=4$. For example, ACK/NACK for a DL data channel or DL control channel received in a subframe n 131 of SCC is transmitted in a subframe n+4 132 of PCC.

Figure 14:
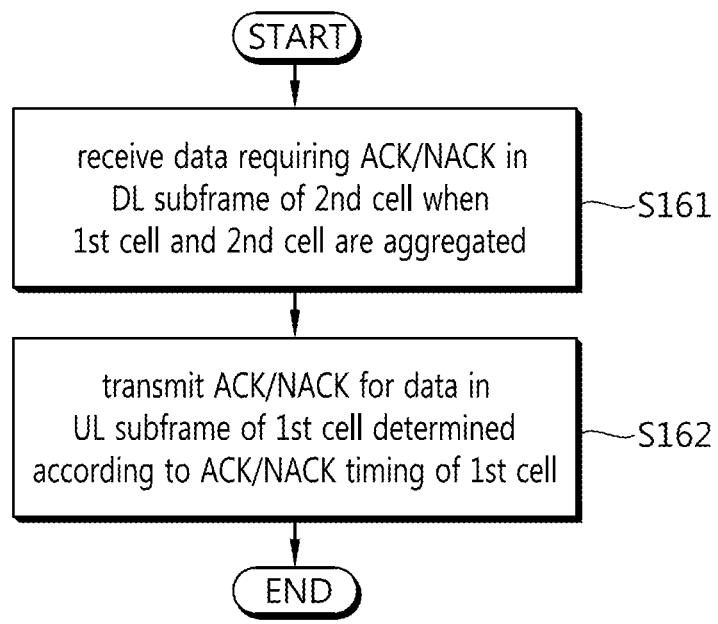
FIG. 14 shows an ACK/NACK transmission method based on Method 1.

FIG. 14 shows an ACK/NACK transmission method based on Method 1.

Referring to FIG. 14, in a situation where a 1$^{st}$ cell and a 2$^{nd}$ cell are aggregated, data requiring ACK/NACK is received in a DL subframe of the 2$^{nd}$ cell (S161). Herein, the data requiring ACK/NACK collectively refers to data requiring an ACK/NACK response such as a PDSCH, a transport block, and a DL SPS release PDCCH. The 1$^{st}$ cell is an FDD cell using an FDD frame, and may be a primary cell. The 2$^{nd}$ cell is a TDD cell using a TDD frame, and may be a secondary cell.

A UE transmits ACK/NACK for the data in a UL subframe of the 1$^{st}$ cell determined according to ACK/NACK timing of the 1$^{st}$ cell (S162).

In accordance with Method 1, there is an advantage in that ACK/NACK delay is minimized because ACK/NACK for downlink data received in the secondary cell is always transmitted after $k_{min}$ subframes elapse on the basis of a point of time at which the downlink data was received.

Furthermore, in conventional TDD, if the number of DL subframes associated with one UL subframe is many, there is a problem in that the number of ACK/NACKs that must be transmitted in the one UL subframe is increased. However, Method 1 is advantageous in that ACK/NACK transmission is distributed.

If the UL subframe of a primary cell in which ACK/NACK is transmitted is a subframe n, the number of ACK/NACK resources that need to be secured in the subframe n may be determined by a transmission mode of the primary cell for a subframe n−$k_{min}$ and a transmission mode in a DL subframe of the secondary cell.

In accordance with Method 1, ACK/NACK timing applied to the UE may be represented by changing Table 5 into Table 10 below.

TABLE 10

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 4 | — | — | — | 4 | 4 | — | — | — | 4 |
| 1 | 4 | — | — | 4 | 4 | 4 | — | — | 4 | 4 |
| 2 | 4 | — | 4 | 4 | 4 | 4 | — | 4 | 4 | 4 |
| 3 | 4 | 4 | 4 | 4 | 4 | 4 | — | — | — | 4 |
| 4 | 4 | 4 | 4 | 4 | 4 | 4 | — | — | 4 | 4 |
| 5 | 4 | 4 | 4 | 4 | 4 | 4 | — | 4 | 4 | 4 |
| 6 | 4 | — | 4 | 4 | 4 | — | — | — | — | 4 |

That is, if a UL-DL configuration of the secondary cell is the same as any one of Table 10 and the primary cell uses an FDD frame, a subframe n is a subframe in which ACK/NACK is transmitted and a number indicated in the subframe n indicates $k_{min}$. Herein, the subframe n−$k_{min}$ indicates a subframe in which downlink data, that is, the subject of ACK/NACK, is received. For example, in Table 10, a UL-DL configuration is 0, and 4 is written in a subframe 9. In this case, it indicates that ACK/NACK for downlink data received in the subframe 5 (=9−4) of the secondary cell is transmitted in the subframe 9.

In accordance with Method 1, ACK/NACK timing applied to the UE may be represented by changing Table 9 into Table 11 below.

TABLE 11

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 4 | 4 | — | | 4 | 4 | — | | | |
| 1 | 4 | 4 | | 4 | 4 | 4 | | | 4 | |
| 2 | 4 | 4 | 4 | 4 | 4 | 4 | | 4 | 4 | |
| 3 | 4 | 4 | | | 4 | 4 | 4 | 4 | 4 | |
| 4 | 4 | 4 | | 4 | 4 | 4 | 4 | 4 | 4 | |
| 5 | 4 | 4 | 4 | 4 | 4 | 4 | 4 | 4 | 4 | |
| 6 | 4 | 4 | | | 4 | 4 | | | 4 | |

In Table 11, a subframe n indicates a subframe in which downlink data is received. A subframe n+$k_{SCC}(n)$ is a subframe in which ACK/NACK for the downlink data is transmitted. Each of values in Table 11 indicates a $k_{SCC}(n)$ value for the subframe n. For example, it indicates that, if a UL-DL configuration is 0 and downlink data is received in the subframe 1 of a secondary cell, ACK/NACK is transmitted in a subframe 5 (of a primary cell) after four subframes elapse.

Tables 10 and 11 and FIG. 13 have a precondition that the radio frame boundaries of a secondary cell and a primary cell are the same. That is, it is a precondition that the radio frame of the primary cell is synchronized with the radio frame of the secondary cell. If the radio frame of the primary cell is not synchronized with the radio frame of the secondary cell, additional subframe delay (indicated by $k_{add}$) for compensating for this asynchronization may be taken into consideration. That is, in Method 1, $k_{SCC}(n)$ may be changed into $k_{min}+k_{add}$.

Or, assuming that downlink data is received in the subframe n of a secondary cell and a subframe in which ACK/NACK for the downlink data is transmitted is n+$k_{SCC}(n)$, if the $k_{SCC}(n)$ is smaller than $k_{min}+k_{add}$, scheduling may be limited so that the downlink data is not transmitted in the subframe n of the secondary cell.

<Method 2>

Method 2 is a method of determining a subframe $n+k_{SCC}(n)$ in which ACK/NACK is transmitted based on TDD ACK/NACK transmission timing in a secondary cell. That is, $k_{SCC}(n)$ is determined as in Table 9, but actual ACK/NACK is transmitted through the UL PCC of a primary cell. In other words, ACK/NACK for a DL data channel or DL control channel received in SCC may be transmitted in a UL subframe of PCC according to ACK/NACK timing configured in SCC.

Figure 15:
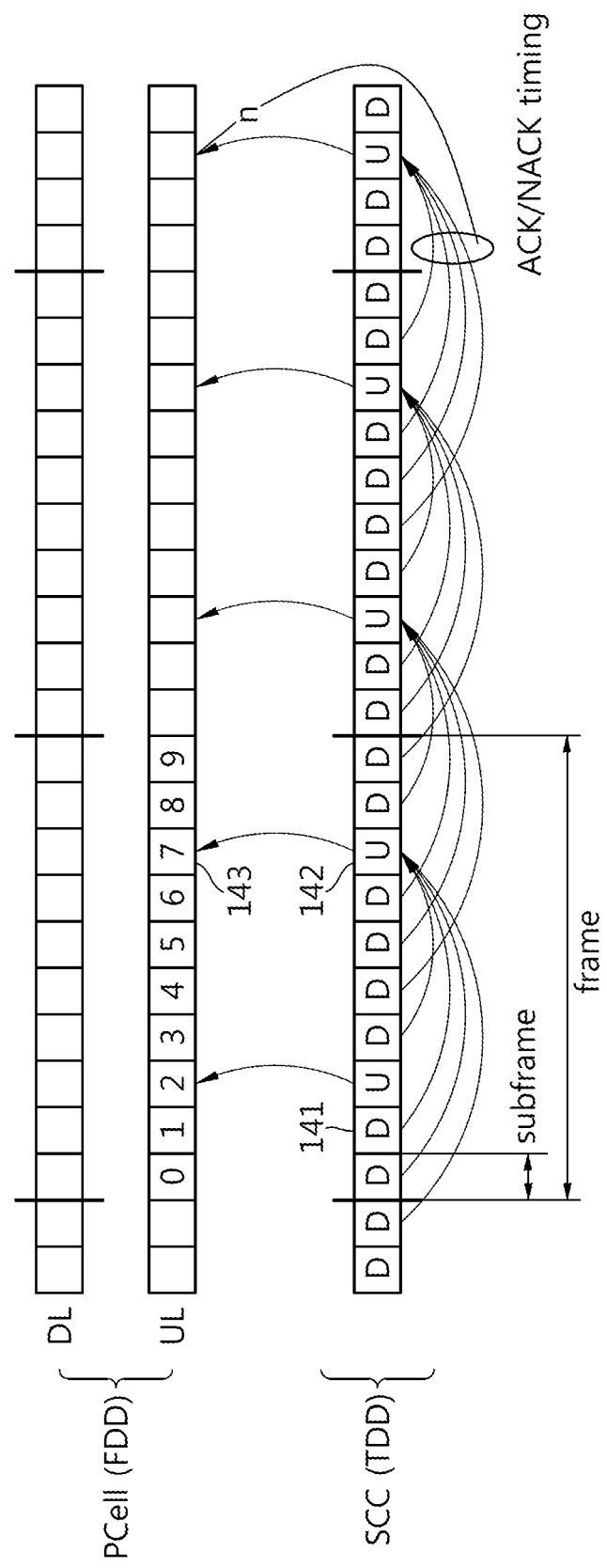
FIG. 15 shows another example of ACK/NACK transmission timing when a primary cell is an FDD cell and a secondary cell is a TDD cell.

FIG. 15 shows another example of ACK/NACK transmission timing when a primary cell is an FDD cell and a secondary cell is a TDD cell.

Referring to FIG. 15, it is assumed that a UL subframe of PCC in which ACK/NACK is transmitted for a DL data channel or DL control channel received in a DL subframe n of PCC is a subframe $n+k_{PCC}(n)$. In case of FDD, to avoid an ACK/NACK transmission delay, it may be set to $k_{PCC}(n)=k_{min}=4$ similarly in the conventional way.

In this case, ACK/NACK for a DL data channel or DL control channel received in a DL subframe n 141 of SCC may be transmitted in a UL subframe n+k(n) 142 of SCC when ACK/NACK timing configured in SCC is applied. In this case, the ACK/NACK is transmitted in a UL subframe 143 of PCC at a time equal to that of the UL subframe n+k(n) 142.

Figure 16:
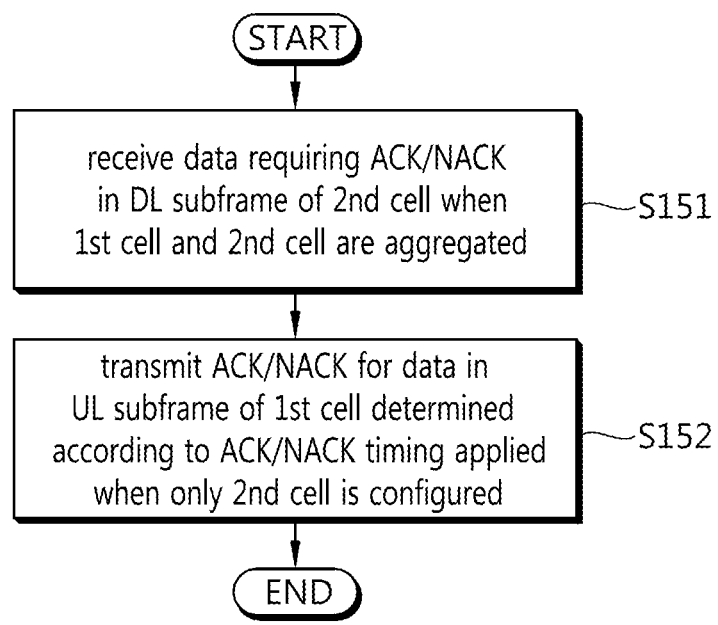
FIG. 16 shows an ACK/NACK transmission method based on Method 2.

FIG. 16 shows an ACK/NACK transmission method based on Method 2.

Referring to FIG. 16, in a situation where a $1^{st}$ cell and a $2^{nd}$ cell are aggregated, data requiring ACK/NACK is received in a DL subframe of the $2^{nd}$ cell (S151). Herein, the data requiring ACK/NACK refers to data requiring an ACK/NACK response such as a PDSCH, a transport block, and a DL SPS release PDCCH. The $1^{st}$ cell is an FDD cell using an FDD frame, and may be a primary cell. The $2^{nd}$ cell is a TDD cell using a TDD frame, and may be a secondary cell.

A UE transmits ACK/NACK for the data in a UL subframe of the $1^{st}$ cell determined according to ACK/NACK timing applied when only the $2^{nd}$ cell is configured (S152).

Such a method has an advantage in that ACK/NACK timing for TDD CC may be equally applied irrespective of whether the TDD CC is used as a primary cell or secondary cell.

The number of resources for ACK/NACK transmission, which must be ensured in a UL subframe of PCC, is determined according to whether a DL subframe is present in a PCC/SCC at a subframe n and according to a transmission mode at the present DL subframe.

If the radio frame of a primary cell is not synchronized with that of a secondary cell, additional subframe delay (indicated by $k_{add}$) for compensating for this asynchronization may be taken into consideration. The $k_{add}$ may be a fixed value or may be a value set through an RRC message. In Method 2, assuming that $k'_{SCC}(n)=k_{SCC}(n)+k_{add}$, ACK/NACK for downlink data received in the subframe n of the secondary cell may be represented as being transmitting in the UL subframe $n+k'_{SCC}(n)$ of the primary cell.

Or, assuming that downlink data is received in the subframe n of the secondary cell and a subframe in which ACK/NACK for the downlink data is transmitted is $n+k_{SCC}(n)$, if the $k_{SCC}(n)$ is smaller than $k_{min}+k_{add}$, scheduling may be limited so that the downlink data is not transmitted in the subframe n of the secondary cell.

If Method 1 is used as the method of transmitting ACK/NACK in a primary cell and the method of transmitting ACK/NACK for a secondary cell, the ACK/NACK for the primary cell and the secondary cell may comply with an ACK/NACK transmission scheme used in FDD. For example, channel selection may be used in which the PUCCH format 1b used in FDD is used when a plurality of serving cells are configured in a UE. That is, ACK/NACK for the secondary cell is transmitted using channel selection that uses the PUCCH format 1b through the primary cell without using a compression scheme, such as ACK/NACK bundling. A compression scheme, such as ACK/NACK bundling, may not be used because only one DL subframe is associated with one UL subframe of the primary cell.

In contrast, if Method 2 is used as the method of transmitting ACK/NACK in a primary cell and the method of transmitting ACK/NACK for a secondary cell, the ACK/NACK for the primary cell and the secondary cell may comply with an ACK/NACK transmission scheme used in TDD. For example, ACK/NACK may be transmitted through channel selection that uses the PUCCH format 1b used when a plurality of serving cells are configured in TDD.

Whether to apply the aforementioned Methods 1 and 2 may be determined according to whether to use cross carrier scheduling or non-cross carrier scheduling. For example, Method 1 may be used in the cross carrier scheduling and Method 2 may be used in the non-cross carrier scheduling.

If CCs to be aggregated use different frame structures (an aggregation of an FDD CC and a TDD CC), one CC may perform UL transmission and another CC may perform DL reception in the same time duration (or subframe). In this case, the UL transmission may have an effect on the DL reception. Therefore, it is not desirable to perform the UL transmission and the DL reception simultaneously in contiguous frequency bands.

To solve this problem, preferably, frequency bands separated enough not to be interfered from each other are grouped, so that the same UL-DL configuration is used in one group and different UL-DL configurations are used in different groups.

For example, if CCs #1 to #5 are aggregated in an ascending order of an allocated frequency band, the CCs #1 and #2 are grouped as a first group and the CCs #3 to #5 are grouped as a second group, and all CCs in the first group use a UL-DL configuration 0, and all CCs in the second group use a UL-DL configuration 3. In this case, the CC #2 and the CC #3 may be CCs separated enough not to be interfered from each other. In the above example, a UE may have an independent RF module for each group, and may use a separate power amplifier. The UE may transmit one PUCCH for each group, and in this case, a problem of a peak to average ratio (PAPR) increase does not occur even if a plurality of PUCCHs are transmitted in uplink.

If the PUCCH is transmitted only with PCC, Method 1 may be applied, and if the PUCCH is transmitted in a specific UL CC of a group (of a non-contiguous frequency band) to which the PCC does not belong, ACK/NACK timing transmitted through the PUCCH may comply with ACK/NACK timing corresponding to a DL subframe of the specific UL CC in which the PUCCH is transmitted.

<HARQ ACK/NACK Transmission Technique in a System in which CCs Using Different Frame Structures with each other>

In the above description, a HARQ ACK/NACK transmission timing is described in a system in which CCs using different frame structures each other, and hereinafter, a HARQ ACK/NACK transmission technique will be described in which CCs using different frame structures with each other.

In case that a combination of applying the ACK/NACK transmission timing when it is unilaterally configured to a primary cell and applying method 1 described above to a ACK/NACK transmission timing of a secondary cell is used, the DL data channel received in the PCC/SCC and the ACK/NACK for the DL control channel may be transmitted using PUCCH format 1b that uses a channel selection used for aggregating among FDD cells.

In an aggregation among FDD cells, only one DL subframe corresponds to one UL subframe. In addition, the multiplexing method used in case that UCIs different from the ACK/NACK are simultaneously generated and the rule of dropping a specific UCI are also applied to the multiplexing method and the dropping rule which are used in the FDD in the same manner. That is, the multiplexing method/ the UCI dropping rule in the FDD which are optimized in case of connecting one UL subframe to one DL subframe is used. For example, in case of scheduling two codewords in a primary cell, PUCCH format 1b that uses the channel selection for the ACK/NACK transmission is used, and the PUCCH resource and the constellation at the moment are the same as those of PUCCH format 1b. Accordingly, even in the section in which it is obscure whether a secondary cell is configured or in the situation that the configuration of a secondary cell is error, the ACK/NACK for the two codewords transmission in a primary cell may be transmitted without error.

That is, in an aggregation among cells that use different frame structures with each other, in case of applying the ACK/NACK transmission timing defined in a FDD cell to all cells (or all cells are configured as $M_{cell}=1$, for example, FDD primary cells and TDD secondary cells are configured to $M_{scell}1$ or TDD primary cells and FDD secondary cells are configured to $M_{pcell}=1$), only the ACK/NACK for one DL subframe of each of the cells is transmitted in one UL subframe. At the moment, in the cell that transmits the PUCCH, the DL ACK/NACK transmission technique defined in aggregating among FDD cells which are optimized in case that the correspondence between DL subframe and UL subframe is 1:1 is used.

Meanwhile, in case that a combination of applying the ACK/NACK transmission timing when it is unilaterally used for a primary cell (FDD cell) and applying method 2 to a secondary cell (TDD cell) is used, the ACK/NACK transmission for the UL PCC of the primary cell and the SCC for the secondary cell may follow the ACK/NACK transmission technique which is defined in the TDD cell (secondary cell).

That is, as the ACK/NACK transmission technique for the UL PCC of the primary cell and the SCC for the secondary cell, 'PUCCH format 1b that uses channel selection' which is defined in aggregating among TDD cells may be used. This is because one PCC UL subframe corresponds to a plurality of DL subframes of PCC and SCC, similar to the aggregation among the TDD cells.

The multiplexing method used in case that UCIs different from the ACK/NACK are simultaneously generated and the dropping rule of a specific UCI, and so on are also applied to the multiplexing method and the dropping rule which are regulated in the TDD in the same manner.

For example, by corresponding $M_{FDDcell}=1$ in case of the FDD cell, and by applying $M_{TDDcell}$ in the TDD cell, the ACK/NACK transmission method is used, which is used for aggregating among the TDD cells that use UL-DL configurations different from each other for $M_{TDDcell}$ combination.

$M_{cell}$ indicates the number of DL subframes that correspond to one UL subframe, and the corresponding DL subframe may include only the DL data channel (PDSCH or DL HARQ) that requires the ACK/NACK response or the effective DL subframes that are available to receive the DL control channel (DL SPS release PDCCH).

In case that any one of DL ACK/NACK timing of the DL cell corresponding to the PUCCH transmission cell or DL subframe follows the ACK/NACK timing defined for the TDD cell (or in case of M>1), the aggregation among cells using frame structures different from each other follows the DL ACK/NACK transmission technique defined in aggregating among the TDD cells.

For example, in case that a primary cell is the TDD cell and a secondary cell is the FDD cell, the ACK/NACK timing of the secondary cell may follow the ACK/NACK timing of the primary cell. In this case, the DL ACK/NACK transmission technique defined in aggregating among the TDD cells is used.

However, in case that new ACK/NACK timing which is not existed before is added based on the timing defined in the existing TDD UL-DL configuration, a transmission technique for additional ACK/NACK timing may be introduced based on the DL ACK/NACK transmission technique defined in aggregating among the TDD cells. For example, although a channel selection technique is defined only for $M \leq 4$ conventionally, a channel selection technique for $M>4$ may be introduced.

In the above description, the selection of ACK/NACK transmission techniques may also be determined for each UL subframe. In case that it is determined for each UL subframe, in a PUCCH transmission cell, a DL subframe connected to a specific UL subframe is configured as 1:1, FDD method may be selected, and if the case of M:1 (M>1, i.e., if a plurality of DL subframes are connected to other UL subframes) is included, the TDD method may be applied to the other UL subframes.

Or, the ACK/NACK transmission technique may also be determined for each cell. For example, a primary cell may be the FDD cell, and first and second secondary cells may be the TDD cell. In this case, in the primary cell, the ACK/NACK for the data received in the first and second secondary cells may be transmitted. The ACK/NACK for the data received in the first secondary cell may follow the ACK/NACK transmission technique of the FDD method, and the ACK/NACK for the data received in the second secondary cell may follow the ACK/NACK transmission technique of the TDD method.

If the channel selection technique used in the aggregation among the TDD cells is used for the TDD ACK/NACK transmission method, when two codewords are transmitted in the primary cell, there is a disadvantage that the PUCCH resource and the in PUCCH format 1b that uses the channel selection becomes different from those of PUCCH format 1b. For example, in PUCCH format 1b that uses the channel selection, as the PUCCH resource for [ACK, ACK, NACK/DTX, NACK/DTX] and [NACK/DTX, ACK, NACK/DTX, NACK/DTX], $n^{(1)}_{PUCCH,1}$ is selected. On the other hand, in PUCCH format 1b, as the PUCCH resource for [ACK, ACK] and [NACK/DTX, ACK], $n^{(1)}_{PUCCH,0}$ is selected.

Meanwhile, in a system in which CCs using frame structures different from each other are aggregated, the HARQ ACK/NACK transmission technique may be changed for each subframe. That is, the ACK/NACK transmission technique may be changed depending on whether only the ACK/NACK for the data received in a first cell is transmitted in the UL subframe in which the ACK/NACK is transmitted or whether the ACK/NACK for the data received in both a first cell and a second cell is transmitted.

As shown in FIG. 13, in case that the FDD cell and the TDD cell are aggregated, when using method 1, onto subframes 0, 2, 3, 4, 5, 7, 8 and 9 of the FDD cell, the ACK/NACK of the FDD cell is transmitted together with the ACK/NACK of the TDD cell. On the other hand, onto subframes 1 and 6 of the FDD cell, only the ACK/NACK of the FDD cell is transmitted. Accordingly, the channel selection is not applied to all UL subframes in the FDD cell, but the channel selection may be applied to only the subframes in which the ACK/NACK of the FDD cell and the ACK/NACK of the TDD cell are transmitted together.

And in the UL subframe of the FDD cell in which only the ACK/NACK of the FDD cell may be transmitted, PUCCH format 1a/1b is used. Here, 'PUCCH format 1a/1b is used' means the ACK/NACK transmission technique in case that the FDD cell is unilaterally configured/used. In addition, the multiplexing method used in case that UCIs different from the ACK/NACK are simultaneously generated and the dropping rule of a specific UCI, and so on are also applied to the multiplexing method and the dropping rule in case that the FDD cell is unilaterally configured/used. PUCCH format 1a/1b may also be applied only to the case that transmission diversity is setup in the PUCCH transmission.

If the channel selection is applied to the UL subframe of the FDD cell in which only the ACK/NACK of the FDD cell is transmitted, in case that the PUCCH transmission diversity is used, there is a disadvantage that the explicit resource which is explicitly designated should be used as a second PUCCH resource.

If method 2 is used in a situation that two cells are aggregated as shown in FIG. 15, onto subframes 2 and 7 in the FDD cell, the ACK/NACK for the FDD cell and the ACK/NACK for the TDD cell are transmitted together, and onto the remaining subframes 0, 1, 3, 4, 5, 6, 8 and 9 of the FDD cell, only the ACK/NACK for the FDD cell is transmitted. Accordingly, a use of the channel selection method which is used in aggregating the TDD cells in all UL subframes of the FDD cells has a disadvantage that the ACK/NACK of a primary cell is also bundled (particularly, in case of M>1 in the TDD cell).

Accordingly, PUCCH format 1a/1b may be used in the UL subframe in which the ACK/NACK of the TDD cell is not transmitted, and PUCCH format 1b that uses the channel selection defined in the aggregation among the TDD cells only in the UL subframe in which the ACK/NACK of the TDD cell is transmitted may be used.

In the FDD, in case that PUCCH format 1a/1b that uses the channel selection for ACK/NACK transmission for a plurality of CCs is setup, if the UL subframe is a subframe which is reserved for SR transmission and the ACK/NACK transmission is necessary, when the SR is positive, two bits of ACK/NACK in which the space bundling is applied for each DL CC is mapped to PUCCH format 1b which is allocated through the RRC for the positive SR in the UL subframe and transmitted. When the SR is negative, a transmission method which is the same as that of the case that only the ACK/NACK is generated is used. In case that the channel selection described above is used even in the UL subframe in which the ACK/NACK for the TDD cell is not transmitted, the ACK/NACK of a primary cell is unnecessarily space bundled and transmitted. On the contrary, in case of using PUCCH format 1a/1b, the ACK/NACK of a primary cell is transmitted through the resource for SR use without the space bundling.

Or, only for the case that MIMO is setup in the FDD cell, PUCCH format 1b may also be used.

Meanwhile, in the aggregation of cells using different frame structures with each other, the number of total UL subframes which are connected to the UL subframe in which the ACK/NACK is transmitted may be M. That is, total number of the DL subframe of a primary cell connected to the UL subframe of the primary cell and the DL subframe of a secondary cell may be M. At the moment, the case of M>4 may be occurred. For example, in case that a primary cell is the FDD cell and a secondary cell is the TDD cell, in case of UL-DL configuration 2, 4 or 5, more than four DL subframes may be connected to the UL subframe of the primary cell. In this case, it may be implemented that the channel selection is not used for total UL subframes in the primary cell, and only PUCCH format 3 is used. That is, configuration of channel selection may be limited.

Meanwhile, in the aggregation of cells using different frame structures with each other, if the channel selection is setup in the ACK/NACK transmission technique, total number of DL subframes which are connected to the UL subframe in which the ACK/NACK is transmitted may be M. At the moment, the case of M>4 may be occurred. Since the channel selection is defined only for the case that M is 4 as the maximum, when the case of M>4 occurs, the case cannot be processed by the conventional technique. Accordingly, it is required to solve the case.

Figure 17:
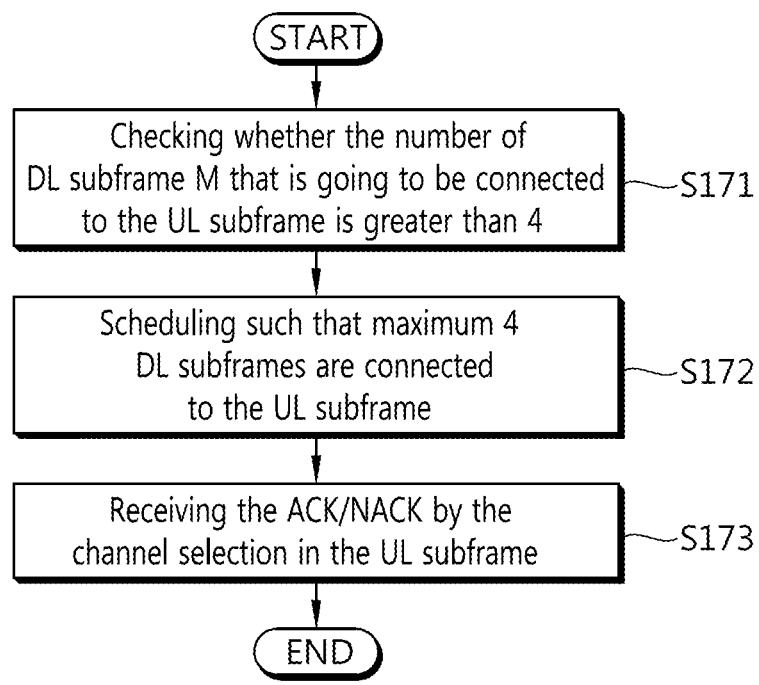
FIG. 17 shows an ACK/NACK transmission method according to an embodiment of the present invention.

FIG. 17 illustrates an ACK/NACK transmission method according to an embodiment of the present invention.

Referring to FIG. 17, a base station checks whether the number of DL subframe M that is going to be connected to the DL subframe is greater than 4 (step, S171).

If M is greater than 4, the base station performs scheduling such that maximum four DL subframes are connected to the UL subframe (step, S172). For example, in case that a primary cell is the TDD call and a secondary cell is the FDD cell, and in case of UL-DL configuration 2, 4 or 5, more than four DL subframes may be connected to the UL subframe of the primary cell. In this case, the base station performs scheduling the channel that requires the ACK/NACK only for four or less subframes among the M subframes.

The base station receives the ACK/NACK by the channel selection in the UL subframe (step, S173). In the aspect of UE, the ACK/NACK is transmitted by the channel selection in the UL subframe.

Meanwhile, a primary cell may be the TDD cell and a secondary cell may be the FDD cell. Let the number of DL subframes of the primary cell which is connected to the UL subframe of the primary cell be $M_P$, and the number of DL subframes of the secondary cell which is connected to the UL subframe of the primary cell be $M_S$. In this case, the case of $M_P<M_S$ may be occurred. Such a situation may be occurred since the DL subframes are continuously exited in the FDD cell, but the DL subframes are discontinuously exited in the TDD cell and the number of UL subframes is restricted. For example, the case of $(M_P, M_S)$=(4, 5) or (2, 3) may be occurred. In such a case, the base station may restrict the number of total DL subframes which is connected to one UL subframe by scheduling only $M_P$ DL subframes, not by scheduling all $M_S$ DL subframes. Based on this, a channel selection technique that the number of selected channel is $M_P$ may be selected. This is because the NACK transmission probability increases by the spatial bundling, the time domain bundling, etc. being applied, if the number of total DL subframes which is connected to one UL subframe increases. The spatial bundling is a technique that compresses the ACK/NACK for a plurality of codewords (transmission blocks) received in one subframe into one ACK/NACK by AND operation. The time bundling is a technique that the ACK/NACK determined in each of a plurality of subframes into one ACK/NACK by AND operation.

Or, a UE determines the situation in which more than four subframes request the ACK/NACK to be an error situation, and does not transmit the PUCCH. Or, the UE transmits the ACK/NACK only for the four subframes and may not transmit the ACK/NACK for the remaining subframes. However, if the ACK/NACK for the PDSCH in which the corresponding PDCCH does not exist such as the SPS PDSCH is included, it may not be dropped and included at all times.

In the aggregation of cells using different frame structures with each other, if the UL transmission and the DL reception are performed together in the same time duration, there is a possibility that the UL transmission influences the DL reception. Accordingly, it is preferable that an identical UL-DL configuration is used in one group and different UL-DL configurations with each other are used among other groups by grouping for frequency bands which are separated as much as do not interfere with each other.

In this case, each group has independent RF module and may use separate power amplifier. Then, one PUCCH for each group may be transmitted, and even if a plurality of PUCCHs is simultaneously transmitted to the UL, the problem of PAPR being increased does not occur.

In case that the PUCCH is not transmitted only to the PCC but the PUCCH is transmitted in a specific UL CC of a group that the PCC is not included (frequency band which is not adjacent), it may be implemented that the ACK/NACK timing transmitted to the corresponding PUCCH follows the ACK/NACK timing that corresponds to the DL subframe of the specific UL CC to which the PUCCH is transmitted.

In case that a primary cell is the FDD cell and a plurality of TDD cells is aggregated as a secondary cell, a frame boundary of the TDD cell may be moved as much as a predetermined offset value such that the ACK/NACK transmission of each TDD cell is not overlapped in the same UL subframe. That is, an offset value may be setup such that the UL subframes among each of the TDD cells are not overlapped. The offset value may be detected by the detection of primary synchronization signal/secondary synchronization signal (PSS/SSS) or notified through a higher layer signal such as a RRC message. In case that such an offset value is given, the channel selection may be applied even in case that three or more cells are aggregated.

The situation that a primary cell is the FDD cell and a secondary cell is the TDD cell is only for example, but not limited thereto. That is, the present invention can be applied to the case that a primary cell is the TDD cell and a secondary cell is the FDD cell.

<Cross-Carrier Scheduling Used in Aggregating Cells that Use Different Frame Structures with each other>

In aggregating cells that use different frame structures with each other, according to the cross-carrier scheduling, application of a part of resources may not be available. Particularly, in case of the UL HARQ, a restriction may occur since the DL subframe for scheduling the ACK/NACK transmission is required. Accordingly, it may be useful to setup the cross-carrier scheduling of the DL HARQ and the UL HARQ independently.

For example, in case of the UL HARQ, it may be restricted that the cross-carrier scheduling is not allowed and it is operated by a non-cross-carrier scheduling. When setup the cross-carrier scheduling, it may be restricted that only the DL HARQ is operated by the cross-carrier scheduling.

Such an operation may be differently applied to whether a primary cell is the FDD cell or the TDD cell. In particular, it may be useful in case that a primary cell is the TDD cell. For example, in case that a primary cell is the FDD cell, the cross-carrier scheduling may be allowed for both of the UL HARQ/DL HARQ, and in case that a primary cell is the TDD cell, the cross-carrier scheduling may be allowed only for the DL HARQ.

As such, the application of the cross-carrier scheduling changes in DL and UL, a cell in which a search space for detecting the PDCCH is located may be changed for UL/DL. Accordingly, the number of blind decoding of the PDCCH may be increased.

In order to prevent this, the DCI format which is of common size in UL/DL may be restricted to detect only in one cell. It is limited to the DCI format which is transmitted from a UE-specific search space. For example, DCI format 0 for UL scheduling is transmitted only in a PUSCH transmission cell for the non-cross-carrier scheduling, DCI format 1A) for DL scheduling is transmitted only in the CSS of a cross-carrier scheduling cell in the PDSCH transmission cell, and a transmission mode-specific DCI format (DCI format 0 and 1A) for DL scheduling is transmitted in the USS of a CCS cell in the PDSCH transmission cell.

The DCI format that has a common size in UL/DL may appropriately divide the number of search space candidates to two cells.

Figure 18:
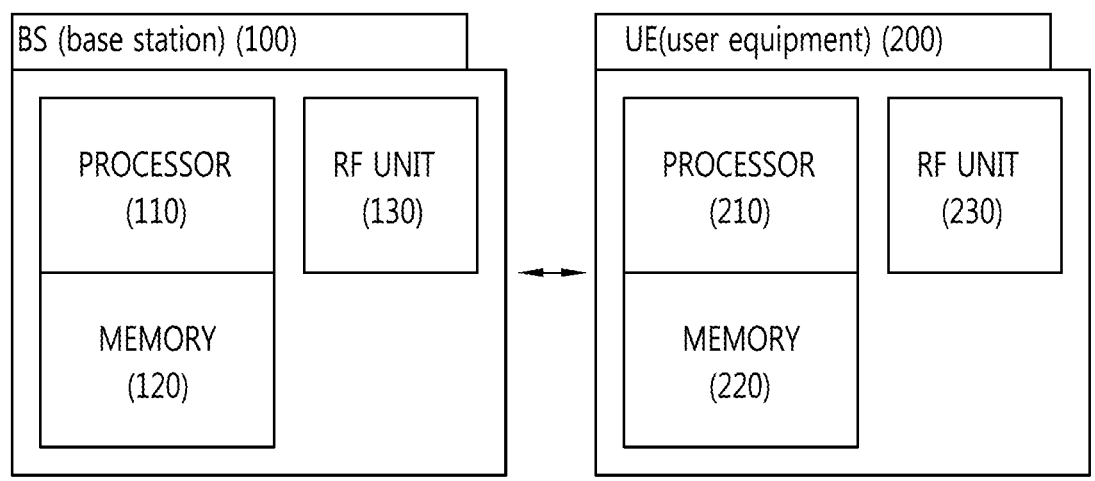
FIG. 18 is a block diagram of a wireless apparatus in which the embodiments of the present invention is implemented.

FIG. 18 is a block diagram of a wireless apparatus in which the embodiments of the present invention is implemented.

A base station 100 includes a processor 110, a memory 120 and a radio frequency (RF) unit 130. The processor 110 implements the proposed functions, processed, and/or methods. For example, the processor 110 configures a plurality of serving cells that use the different frame structures with each other to a UE, and transmits data that requires an ACK/NACK response through each of the serving cells. At the moment, among M DL subframes which are connected to the UL subframe in which the ACK/NACK is transmitted, only four or less DL subframes may actually perform scheduling. The memory 120 is connected to the processor 110 and configured to store various information used for the operations for the processor 110. The RF unit 130 is connected to the processor 110 and configured to transmit and/or receive a radio signal.

A UE 200 includes a processor 210, a memory 220, and a RF unit 230. The processor 210 implements the proposed functions, processed, and/or methods. For example, the processor 210 may receive the configuration of a first serving cell and a second serving cell that use different frame structures with each other, receive data in the DL subframe of the second serving cell, and transmit the ACK/NACK signal in response to the data in the UL subframe of the first serving cell. At the moment, the UL subframe may be determined based on the ACK/NACK timing of the first serving cell or the ACK/NACK timing of the second serving cell. As for the ACK/NACK transmission technique, a technique which is defined in aggregating among the FDD cells or a technique which is defined in aggregating among the TDD cells may be used, and the transmission technique may be changed depending on whether only the ACK/NACK for the received data from the first serving cell in the UL subframe in which the ACK/NACK is transmitted or the ACK/NACK for the received data from the first serving cell and the second serving cell is transmitted.

The processor 110, 210 may include Application-Specific Integrated Circuits (ASICs), other chipsets, logic circuits, data processing devices and/or converters for mutually converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for transmitting and/or receiving radio signals. When an embodiment is implemented in software, the above-described scheme may be implemented as a module (process, function, etc.) for performing the above-described function. The module may be stored in the memory 120, 220 and executed by the processor 110, 210. The memory 120, 220 may be placed inside or outside the processor 110, 210 and connected to the processor 110, 210 using a variety of well-known means.

What is claimed is:

1. A method for transmitting positive-acknowledgement (ACK)/negative-acknowledgement (NACK) information, by a user equipment (UE) configured with a first cell and a second cell, the method comprising:

receiving data in at least one of a subframe n of the first cell and a subframe n of the second cell, wherein n is an integer; and transmitting the ACK/NACK information for the data in a subframe n+k of the first cell, wherein k is an integer, wherein when the first cell is based on a Frequency Division Duplex (FDD) radio frame and the second cell is based on a Time Division Duplex (TDD) radio frame, k is 4, wherein a physical uplink control channel (PUCCH) format used for transmitting the ACK/NACK information is based on whether the subframe n of the second cell is a subframe which can be used for receiving the data, wherein when the subframe n of the second cell is a subframe which cannot be used for receiving the data, the ACK/NACK information is transmitted in a first PUCCH format in the subframe n+k of the first cell, wherein when the subframe n of the second cell is a subframe which can be used for receiving the data, the ACK/NACK information is transmitted in a second PUCCH format in the subframe n+k of the first cell, wherein the first PUCCH format is a PUCCH format 1a or 1b, wherein the second PUCCH format is a PUCCH format 1b with channel selection, wherein the PUCCH format 1a or 1b is a signal transmission scheme wherein 1 or 2 bit-ACK/NACK information, respectively, is transmitted based on a resource which is determined based on a first control channel element (CCE) of a physical downlink control channel scheduling the data, and wherein the PUCCH format 1b with channel selection is a signal transmission scheme in which up to 4 bit-ACK/NACK information is transmitted based on a combination of 2 bits and one selected resource among a plurality of resources.

2. The method of claim 1, wherein the PUCCH format 1b with channel selection is a signal transmission scheme that involves a 2 bit-ACK/NACK signal transmitted based on one selected resource among a plurality of resources.

3. The method of claim 1, wherein the first cell is a primary cell on which the UE performs an initial connection establishment process or a connection reestablishment process with a base station.

4. The method of claim 3, wherein the second cell is a secondary cell which is added to the primary cell.

5. The method of claim 1, wherein when the subframe n of the second cell is a subframe which cannot be used for receiving the data, subframe n is an uplink subframe.

6. A user equipment (UE) for transmitting positive-acknowledgement (ACK)/negative-acknowledgement (NACK) information, the UE configured with a first cell and a second cell and comprising:

a transceiver; and a processor, operatively coupled to the transceiver, wherein the processor is configured to:

control the transceiver to receive data in at least one of a subframe n of the first cell and a subframe n of the second cell, wherein n is an integer, and control the transceiver to transmit the ACK/NACK information for the data in a subframe n+k of the first cell, wherein k is an integer number, wherein when the first cell is based on a Frequency Division Duplex (FDD) radio frame and the second cell is based on a Time Division Duplex (TDD) radio frame, k is 4, wherein a physical uplink control channel (PUCCH) format used for transmitting the ACK/NACK information is based on whether the subframe n of the second cell is a subframe which can be used for receiving the data, wherein when the subframe n of the second cell is a subframe which cannot be used for receiving the data, the ACK/NACK information is transmitted in a first PUCCH format in the subframe n+k of the first cell, wherein when the subframe n of the second cell is a subframe which can be used for receiving the data, the ACK/NACK information is transmitted in a second PUCCH format in the subframe n+k of the first cell, wherein the first PUCCH format is a PUCCH format 1a or 1b, wherein the second PUCCH format is a PUCCH format 1b with channel selection, wherein the PUCCH format 1a or 1b is a signal transmission scheme which 1 or 2 bit-ACK/NACK information, respectively, is transmitted based on a resource which is determined based on a first control channel element (CCE) of a physical downlink control channel scheduling the data, and wherein the PUCCH format 1b with channel selection is a signal transmission scheme in which up to 4 bit-ACK/NACK information is transmitted based on a combination of 2 bits and one selected resource among a plurality of resources.

7. The UE of claim 6, wherein the PUCCH format 1b with channel selection is a signal transmission scheme that involves a 2 bit ACK/NACK signal transmitted based on one selected resource among a plurality of resources.

8. The UE of claim 6, wherein the first cell is a primary cell on which the UE performs an initial connection establishment process or a connection reestablishment process with a base station.

9. The UE of claim 8, wherein the second cell is a secondary cell which is added to the primary cell.

10. The UE of claim 6, wherein when the subframe n of the second cell is a subframe which cannot be used for receiving the data, subframe n is an uplink subframe.

\* \* \* \* \*